(12) United States Patent
Sugeno et al.

(10) Patent No.: US 9,608,451 B2
(45) Date of Patent: Mar. 28, 2017

(54) ELECTRIC POWER SUPPLYING APPARATUS, ELECTRIC POWER SUPPLYING METHOD, INVERTER, AND ELECTRIC VEHICLE

(71) Applicant: Sony Corporation, Tokyo (JP)

(72) Inventors: Naoyuki Sugeno, Fukushima (JP); Noritoshi Imamura, Miyagi (JP); Eiji Kumagai, Kanagawa (JP); Koji Umetsu, Miyagi (JP); Atsushi Minami, Miyagi (JP); Masayuki Yasuda, Fukushima (JP)

(73) Assignee: Sony Corporation, Tokyo (JP)

( * ) Notice: Subject to any disclaimer, the term of this patent is extended or adjusted under 35 U.S.C. 154(b) by 696 days.

(21) Appl. No.: 13/852,682

(22) Filed: Mar. 28, 2013

(65) Prior Publication Data
US 2013/0264865 A1  Oct. 10, 2013

(30) Foreign Application Priority Data

Apr. 6, 2012 (JP) .................. 2012-087378
Oct. 2, 2012 (JP) .................. 2012-220150

(51) Int. Cl.
 H02J 5/00 (2016.01)
 H02J 3/32 (2006.01)
 H02J 3/38 (2006.01)

(52) U.S. Cl.
CPC ..... *H02J 5/00* (2013.01); *H02J 3/32* (2013.01); *H02J 3/383* (2013.01); *H02J 3/386* (2013.01);
(Continued)

(58) Field of Classification Search
CPC ...... H02J 5/00; H02J 3/32; H02J 3/383; H02J 3/386; Y10T 307/313; Y10T 307/549;
(Continued)

(56) References Cited

U.S. PATENT DOCUMENTS 5,550,445 A * 8/1996 Nii ..................... B60K 6/46
                                                180/65.245
6,255,008 B1 * 7/2001 Iwase ................. B60L 11/1881
                                                180/65.275
(Continued)

FOREIGN PATENT DOCUMENTS

| JP | 2011-045176 | 3/2011 |
| JP | 2011-083060 | 4/2011 |
| JP | 2011-172334 | 9/2011 |
| JP | 2011-223731 | 11/2011 |

*Primary Examiner* — Zeev V Kitov
(74) *Attorney, Agent, or Firm* — Chip Law Group

(57) ABSTRACT

The present disclosure provides an electric power supplying apparatus including: an electric storage device; and a control portion configured to control processing for mixing an output from the electric storage device, and an electric power of an external electric power system with each other in accordance with at least one of a peak shift command, a load electric power, and a remaining capacity of the electric storage device, wherein an alternating current electric power is formed in the mixing processing. When the electric power supplying apparatus further includes an electric power generating apparatus, processing for mixing an output from the electric power generating apparatus, an output from the electric storage device, and an electric power of the external electric power system with one another, is controlled.

13 Claims, 22 Drawing Sheets

(52) U.S. Cl.
CPC ........... *Y02E 10/563* (2013.01); *Y02E 10/566* (2013.01); *Y02E 10/763* (2013.01); *Y02E 60/721* (2013.01); *Y02E 70/30* (2013.01); *Y04S 10/126* (2013.01); *Y10T 307/313* (2015.04); *Y10T 307/549* (2015.04)

(58) Field of Classification Search
CPC ..... Y02E 70/30; Y02E 10/563; Y02E 10/566; Y02E 10/763; Y02E 60/721
See application file for complete search history.

(56) References Cited

U.S. PATENT DOCUMENTS

| | | | | |
|---|---|---|---|---|
| 6,847,127 | B1* | 1/2005 | Lee | B60L 11/1861 |
| | | | | 290/40 C |
| 8,972,148 | B2* | 3/2015 | Nawata | B60K 6/445 |
| | | | | 180/65.21 |
| 2005/0040786 | A1* | 2/2005 | Ichinose | H02J 7/34 |
| | | | | 320/101 |
| 2011/0140667 | A1* | 6/2011 | Moon | H02J 3/32 |
| | | | | 320/134 |
| 2011/0156655 | A1* | 6/2011 | Kim | H01M 10/441 |
| | | | | 320/134 |
| 2011/0178977 | A1* | 7/2011 | Drees | G05B 15/02 |
| | | | | 706/52 |
| 2012/0013192 | A1* | 1/2012 | Park | H02J 3/383 |
| | | | | 307/80 |
| 2014/0009981 | A1* | 1/2014 | Charles Knill | H02M 3/33569 |
| | | | | 363/37 |

* cited by examiner

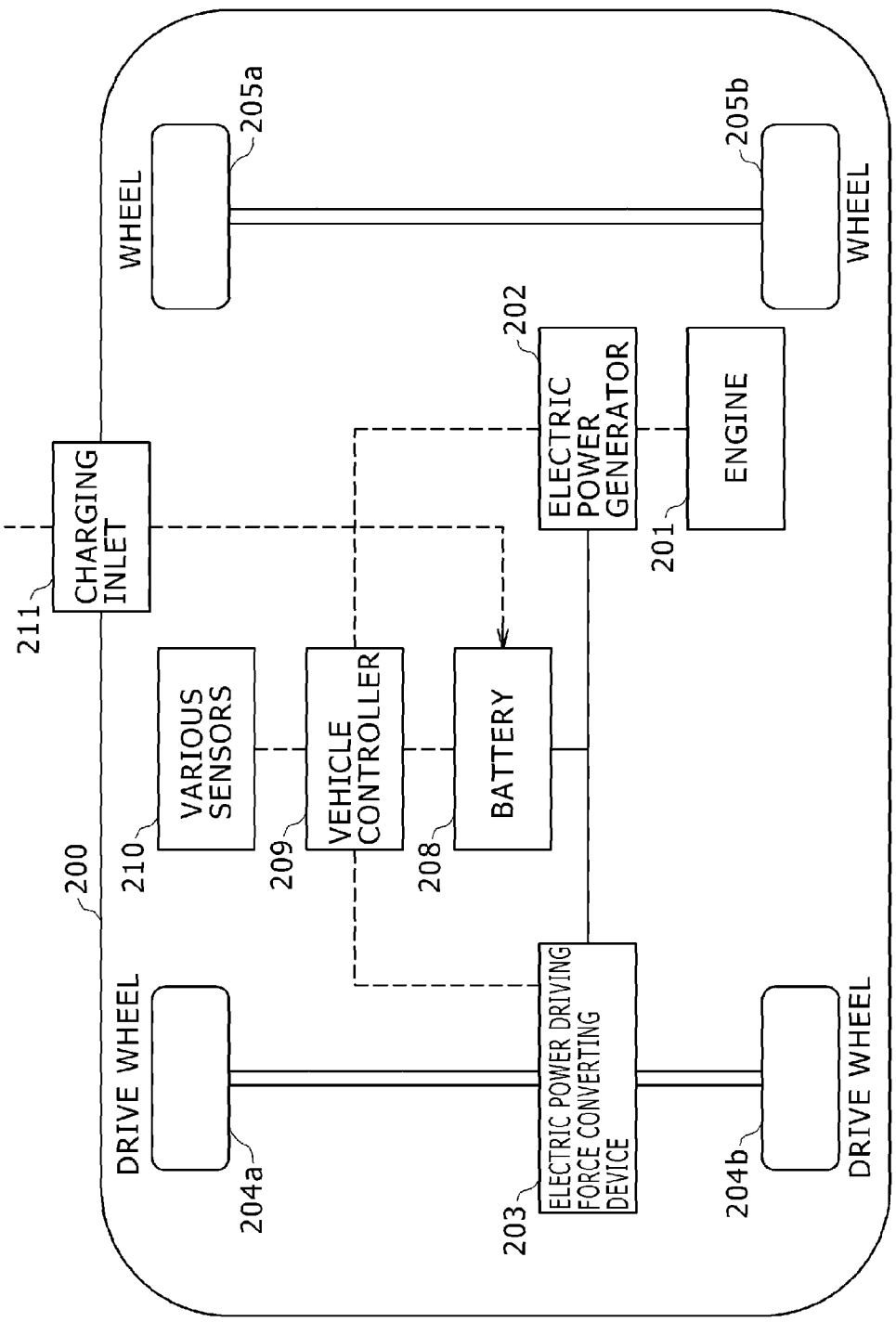

ELECTRIC POWER SUPPLYING APPARATUS, ELECTRIC POWER SUPPLYING METHOD, INVERTER, AND ELECTRIC VEHICLE

CROSS REFERENCES TO RELATED APPLICATIONS

The present application claims priority to Japanese Priority Patent Application JP 2012-087378 filed in the Japan Patent Office on Apr. 6, 2012, JP 2012-220150 filed in the Japan Patent Office on Oct. 2, 2012, the entire content of which is hereby incorporated by reference.

BACKGROUND

The present disclosure relates to an electric power supplying apparatus which is capable of utilizing an A.C. (alternating current) electric power from an external electric power system and an output electric power from an electric storage device, an electric power supplying method used in the same, an inverter used in the same, and an electric vehicle including the same.

When an amount of electric power supply from an external electric power system (referred to as "a commercial utility power source, a grid or the like") is reduced due to an accident or the like, or an electric power demand is seasonally increased, the fear that the electric power demand is increased for the amount of electric power supply, and thus a sudden electric power outage is caused is generated in some cases. In addition thereto, it is supposed that the electric power outage is caused due to a disaster such as torrential rain or lightning stoke.

Heretofore, it is known to use an Uninterruptable Power Supply (UPS) which supplies an electric power to a peripheral apparatus such as a computer when an electric power failure such as an electric power outage is caused. This technique, for example, is disclosed in Japanese Patent Laid-Open No. 2011-045176. However, the existing UPS is such an apparatus that is effective in the electric power outage for a short time, and temporarily supplies the electric power to the computer and the peripheral apparatus. Therefore, the existing UPS is insufficient for supplying an in-home electric power in a phase of generation of large-scale electric power outage for a long time. In addition thereto, there is caused a problem that the existing UPS is operated in the phase of the electric power outage and, for example, cannot be used in a use application in which a used amount of external electric power system in the home is reduced.

Recently, an at-home electric storage device having a larger capacity has been put to practical use. Utilization of the at-home electric storage device results in that the electric power supply in the phase of the electric power outage can be ensured, and the electric power demand and the used amount of electric power of the external electric power system can be both reduced. For example, it is expected that the supply of the A.C. electric power from the external electric power system is reduced to compensate for the insufficient electric power by the electric storage device. In addition thereto, there is caused the fear that the electric power demand in the home is increased to exceed a contracted electric power contracted with an electric power provider, and thus a breaker is actuated to cut out the electric power. In such a case, an output electric power from the electric storage device is supplied, thereby making it possible to avoid such a case as for the in-home electric power to exceed the contracted electric power.

Japanese Patent Laid-Open No. 2011-223731 describes that a system for supplying an A.C. electric power of an external electric power system to a load, and a system for outputting an A.C. electric power into which an output electric power from an electric storage device is converted by an inverter are switched over to each other. Also, Japanese Patent Laid-Open No. 2011-083060 describes that an output electric power from a solar cell, and an output electric power from an electric storage device are mixed with each other, and the resulting output electric power is outputted.

In addition, recently, a power generating apparatus utilizing a recyclable energy from a solar power generation system, a wind power generation system, or the like is installed in homes in many cases. The electric storage device can be charged with the electricity from an electric power generation output from this sort of electric power generating apparatus. In the case of the solar electric power generation system, a purchase system in which the electric power provider purchases the generated electric power is widely operated. The purchase system is classified into a full amount purchase system for purchasing a full amount of electric power by the solar power generation, and a purchase system for purchasing a remaining electric power (referred to as "a surplus electric power") which is obtained by subtracting an amount of consumed electric power from an amount of electric power by the solar electric power generation. The surplus electric power purchase system is the current Japanese system.

Therefore, a use application of the generated electric power by the solar electric power generation system includes a use application in which the generated electric power by the solar electric power generation system is submitted together with the system electric power for the at-home electric power, a use application in which the generated electric power by the solar electric power generation system is submitted for the charging electric power for the electric storage device, and a use application in which the generated electric power by the solar electric power generation system is subjected to the reverse electric power flow to be submitted for the electric power selling. In the related art as well, Japanese Patent Laid-Open No. 2011-172334 describes that a charging current value for a battery is limited based on a remaining capacity of the battery, a load-used electric power pattern, and an electric power generation estimating pattern, whereby the battery is prevented from being charged with the electricity from an excessive charging current value.

SUMMARY

Although Japanese Patent Laid-Open No. 2011-083060 describes that the output electric power from the solar cell, and the electric power formed from the electric storage device are mixed with each other, and the resulting electric power is supplied to the load, it is not described that the mixture ratio is positively controlled. That is to say, in the case of the electric storage device, when the discharge is carried out although the remaining capacity is less, the electric storage device suffers the over discharge and thus the battery is damaged. In addition, in the case where the external electric power system and the electric storage device are used in combination, when it is feared that the in-home electric power is increased to exceed the contracted electric power contracted with the electric power provider, it is necessary to supply the output electric power from the electric storage device to the load. In such a manner, it may be impossible to treat the A.C. electric power of the external electric power system the same way as the output electric power from the solar cell.

Moreover, although Japanese Patent Laid-Open No. 2011-172334 describes that the electric storage device is charged with the electricity by both of the external electric power system and the electric power generating apparatus, the control as to how the charging is carried out by using both of the external electric power system and the electric power generating apparatus is not described.

The present disclosure is desirable to provide an electric power supplying apparatus which is capable of suitably controlling mixture processing when an A.C. electric power of an external electric power system, and an output electric power from an electric storage device are mixed with each other, and also suitably charging the electric storage device with electricity by both of the external electric power system and an electric power generating apparatus such as a solar cell, an electric power supplying method used in the same, an inverter used in the same, and an electric vehicle including the same.

In order to solve the above problems, according to an embodiment of the present disclosure, there is provided an electric power supplying apparatus including: an electric storage device; and a control portion configured to control processing for mixing an output from the electric storage device, and an electric power of an external electric power system with each other in accordance with at least one of a peak shift command, a load electric power, and a remaining capacity of the electric storage device, wherein an alternating current electric power is formed in the mixing processing.

According to another embodiment of the present disclosure, there is provided an electric power supplying method including: executing processing for mixing an output from an electric storage device, and an electric power of an external electric power system with each other, thereby outputting an alternating current electric power; and controlling a mixture ratio in the mixing processing in accordance with at least one of a peak shift command, a load electric power, and a remaining capacity of the electric storage device.

According to still another embodiment of the present disclosure, there is provided an inverter, wherein a direct current electric power formed from an electric power of an external electric power system, and a direct current electric power from an electric storage device are mixed with each other, and a resulting electric power is supplied to the inverter, thereby forming an alternating current electric power.

According to yet another embodiment of the present disclosure, there is provided an electric vehicle including: a converter configured to receive an electric power from an electric storage device, and convert the electric power into a driving force for the electric vehicle; and a controller configured to execute information processing about vehicle control based on information on the electric storage device, wherein the electric vehicle executes mixing processing for mixing an output from the electric storage device, and an electric power of an external electric power system with each other, thereby outputting an alternating current electric power, and controls a mixture ratio in the mixing processing in accordance with a load electric power, and a remaining capacity of the electric storage device.

According to a further embodiment of the present disclosure, there is provided an electric power supplying apparatus including: a connecting portion configured to connect an external electric power system and an electric power generating apparatus to each other; an electric storage device; and a control portion configured to control processing for mixing an output from the electric power generating apparatus, an output from the electric storage device, and an electric power of the external electric power system with one another in accordance with at least one of a peak shift command, a load electric power, and a remaining capacity of the electric storage device, wherein an alternating current electric power is formed in the mixing processing.

According to an even further embodiment of the present disclosure, there is provided an electric vehicle including: a converter configured to receive an electric power from an electric storage device, and convert the electric power into a driving force for the electric vehicle; and a controller configured to execute information processing about vehicle control based on information on the electric storage device, wherein the electric vehicle executes processing for mixing an output from an electric power generating apparatus, an output from the electric storage device, and an electric power of an external electric power system with one another, thereby outputting an alternating current electric power, and controls a mixture ratio in the mixing processing in accordance with a load electric power, and a remaining capacity of the electric storage device.

According to the embodiments of the present disclosure, the A.C. electric power of the external electric power system and the output electric power from the electric storage device are mixed with each other, whereby an abrupt change in the premise (indoor) load is absorbed, thereby making it possible to make the use of the A.C. electric power of the external electric power system approximately constant. As a result, it is possible to reduce the contracted electric power and thus it is possible to suppress the increase in the electric power charge.

Additional features and advantages are described herein, and will be apparent from the following Detailed Description and the figures.

BRIEF DESCRIPTION OF THE FIGURES

FIG. 26 is a schematic diagram explaining a third example of application to which the electric power supplying apparatus according to the first embodiment of the present disclosure is applied.

DETAILED DESCRIPTION

Embodiments of the present disclosure will be described hereinafter. It is noted that although the embodiments which will be described below are suitable examples of the present disclosure, and thus various kinds of limits preferable in technique are added thereto, in the following description, the scope of the present disclosure is by no means limited to these embodiments unless the effect that the present disclosure is limited is described.

The description of the present disclosure will be given below in accordance with the following order.

<1. First Embodiment>
<2. Second Embodiment>
<3. Third Embodiment>
<4. Application Example>
<5. Modified Changes>

<1. First Embodiment>

[Configuration of Electric Power Supplying Apparatus]

Figure 1:
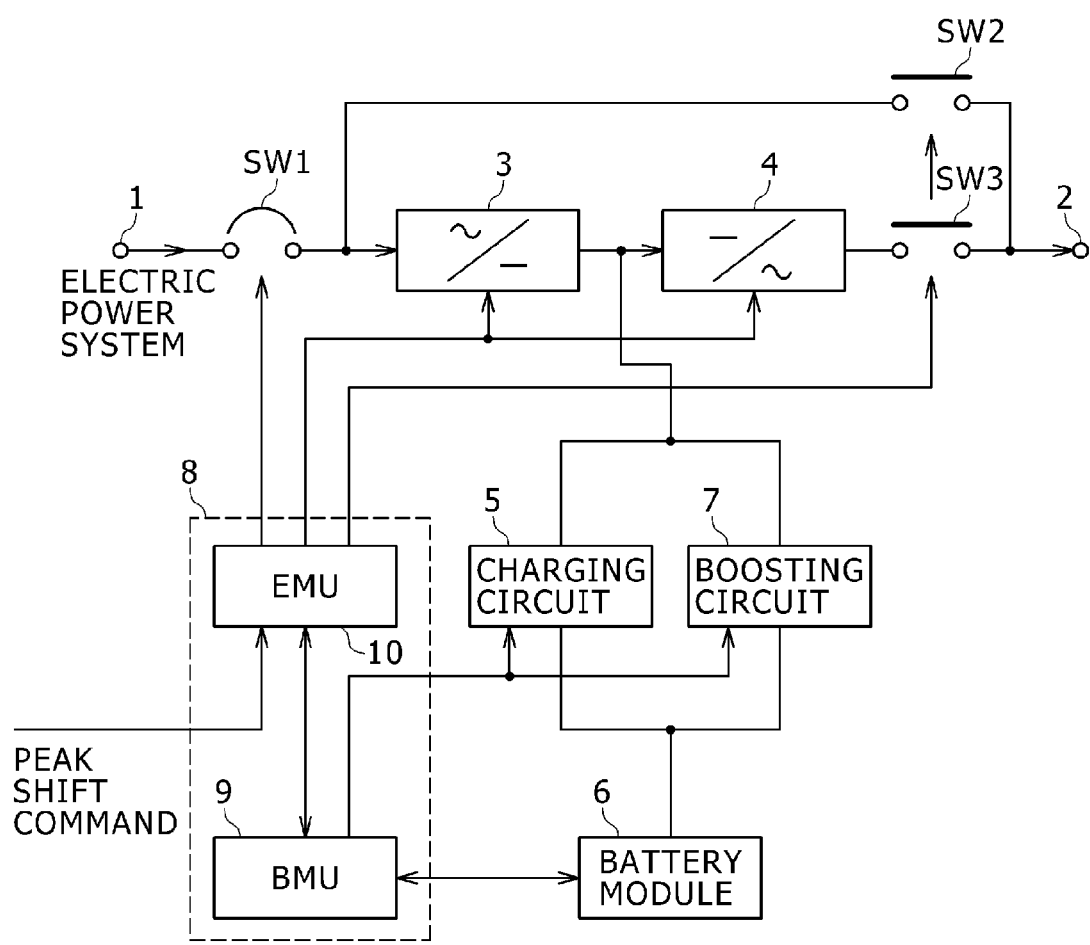
FIG. 1 is a block diagram showing a configuration of an electric power supplying apparatus according to a first embodiment of the present disclosure.

An electric power supplying apparatus (power source system) according to a first embodiment of the present disclosure will now be described with reference to FIG. 1. An electric power which is generated in an electric power plant of an electric power provider is supplied to an electric energy meter of a home through both of a power distribution grid and an electric grid (both not shown). Also, an A.C. electric power is supplied from the electric energy meter to an input terminal 1 for (commercial utility electric power of) an external electric power system shown in FIG. 1. It is noted that although a description will now be given with respect to electric power control in a home, the present disclosure can be applied to an area as long as the area is one, such as plural homes (community), a building or a factory, which is laid out in terms of the electric power supply in addition to the home.

In general, an electric power line is introduced from an outdoor distribution line to a building through a leading wire, and the electric power line is connected to an electric power meter. A distribution board is connected to an output side of the electric power meter. An electronic apparatus is connected to a domestic wiring extending from the distribution board. For example, the electric power supplying apparatus according to the first embodiment of the present disclosure is provided between the electric power meter and the distribution board. In the case of a general house, a single-phase three-wire system is adopted, and three electric wires composed of a central neutral wire and two voltage wires are used. A voltage of 100 V can be utilized by utilizing both of the neutral wire and one voltage wire, and a voltage of 200 V can be utilized by utilizing two voltage wires. It is noted that the present disclosure can be applied to a single-phase two-wire system as well.

The commercial utility electric power is supplied to an A.C. electric power supply terminal 2 through both of switches SW1 and SW2. The switch SW1 is a breaker of the distribution board in some cases. An indoor electric power grid is connected to the A.C. electric power supply terminal 2. For example, although not illustrated, the A.C. electric power is supplied to a distribution switchboard (including the distribution board). Also, the electric power is supplied to electronic apparatuses in an electronic apparatus group through electric power wires derived from the distribution switchboard, and sockets. Examples of the electronic apparatus group are an air conditioner, a refrigerator, a lighting apparatus, a washing machine, a television set, and the like.

The commercial utility electric power is supplied to an AC-DC (alternating current-direct current) converter 3 through the switch SW1. The AC-DC converter 3 converts the commercial utility electric power into a D.C. electric power. A D.C. output electric power from the AC-DC converter 3 is supplied to a DC-AC inverter 4. The DC-AC inverter 4 forms an A.C. electric power having the same level and frequency as those of the commercial utility electric power. An A.C. output electric power from the DC-AC inverter 4 is fetched to the A.C. electric power supply terminal 2 through a switch SW3. The switches SW1, SW2, and SW3 are controlled so as to be turned ON or OFF in accordance with control signals, respectively.

An electric storage device, for example, a battery module 6 is connected between an output side of the AC-DC converter 3, and an input side of the DC-AC inverter 4 through a charging circuit 5. As far as the battery module 6 concerned, it is possible to use a structure in which, for example, eight cylindrical lithium-ion secondary batteries are connected in parallel with one another to structure a battery block, and 16 battery blocks are connected in series with one another to be accommodated in a common case. Other examples of the battery module 6 are an electric double layer, a large-capacity capacitor, and the like. The battery module 6 is charged with the electricity from the D.C. output electric power from the AC-DC converter 3 through the charging circuit 5. It is noted that the battery module 6 is by no means limited to stationary type one, but may be one which is used in an electric vehicle.

The D.C. output electric power from the battery module 6 is supplied to the DC-AC inverter 4 through a boosting circuit 7 serving as a discharging circuit. The boosting circuit 7 boosts the D.C. output voltage from the battery module 6. The higher voltage can be inputted to the DC-AC inverter 4 by the boosting circuit 7, thereby making it possible to enhance an efficiency of the DC-AC conversion. A DC-DC converter, for example, can be used as the boosting circuit 7. It is noted that the provision of the boosting circuit 7 is not essential, but it is only necessary to provide a discharging path for the battery module 6.

A controller 8 for controlling the power source system is provided. The controller 8 mainly includes a Battery Management Unit (BMU) which controls the charging/discharging of the battery module 6, and an Energy Management Unit (EMU) 10 which receives information on the load side and generates a control signal for switching over an operation mode to another one. The BMU 9 and the EMU 10 include micro-control units, respectively, and a communication is made between the BMU 9 and the EMU 10.

The BMU 9 monitors a state (a remaining capacity, a battery voltage, a battery temperature, and the like) of the battery module 6. Thus, the BMU 9 controls both of the charging circuit 5 and the boosting circuit 7 in such a way that a suitable charging/discharging operation is carried out. Information, on the remaining capacity of the battery module 6, which the BMU 9 acquires is transmitted to the EMU 10, and is used for the switching of the operation mode of the EMU 10. The EMU 10 controls the switches SW1, SW2, and SW3, thereby controlling both of the AC-DC converter 3 and the DC-AC inverter 4. It is noted that the control for the circuit, for example, is carried out in accordance with turn-ON/OFF of an operation power source for the circuit.

A peak shift command is issued to the EMU 10. The peak shift command is automatically issued in a time zone in which a total electric power (load electric power) of the electric power consumed indoors becomes relatively large. Alternatively, the peak shift command may also be issued in a time zone set by a user. Or, a monitoring portion for monitoring an indoor electric power may be provided, and the peak shift command may be issued when almost all the indoor electric power exceeds a predetermined electric power. As an example, when the fear that the indoor electric power exceeds the contracted electric power contracted with the electric power provider is generated, the peak shift command is issued. In addition thereto, the peak shift command can also be issued in accordance with an electric power limit command issued from an electric power industry company. It is noted that although in the first embodiment, the BMU 9 and the EMU 10 are described as being provided separately from each other, the BMU 9 and the EMU 10 may also be realized by one microcomputer or the like to be integrated with each other.

[Operation Modes]

In the first embodiment of the present disclosure, the following operation modes (running modes) are made possible in accordance with the control made by the controller 8.

Figure 2:
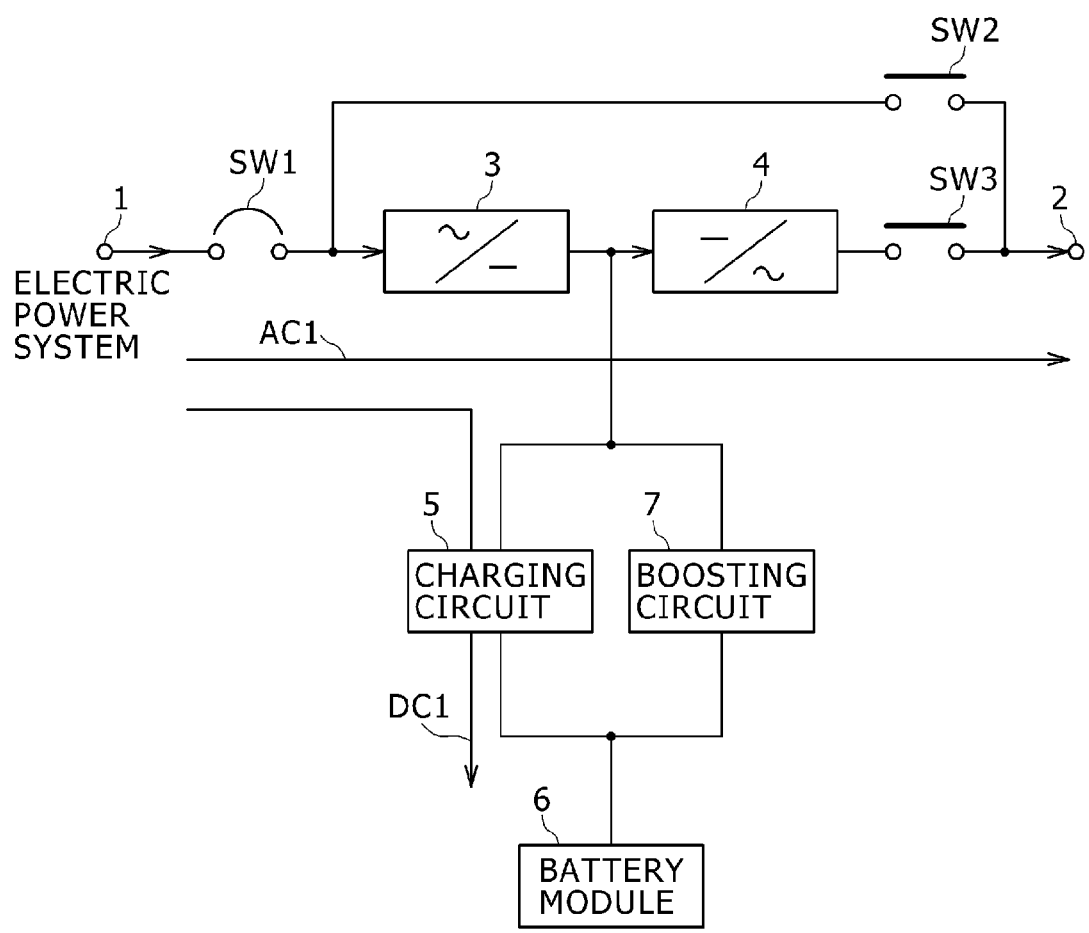
FIG. 2 is a block diagram used in explaining a first operation mode in an operation of the electric power supplying apparatus according to the first embodiment of the present disclosure.

First operation mode: as shown in FIG. 2, only a commercial utility electric power AC1 which is formed by passing both of the AC-DC converter 3 and the DC-AC inverter 4 is supplied to the load. Also, the battery module 6 is charged with the electricity from a D.C. power source DC1 outputted from the AC-DC converter 3. Both of the switches SW1 and SW3 are turned ON, and the switch SW2 is turned OFF. In addition, the charging circuit 5 is turned ON and the boosting circuit 7 is turned OFF. In the following description, the first operation mode will be referred to as "a charging priority mode."

Figure 3:
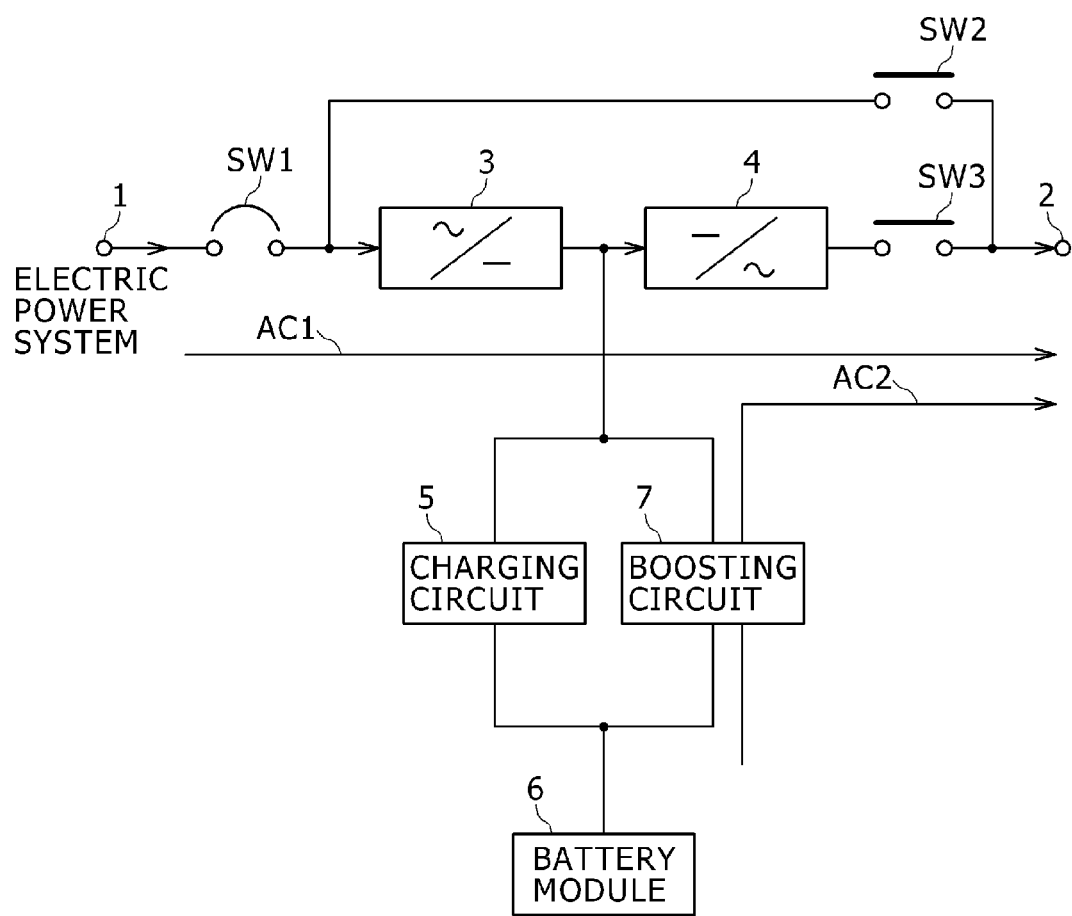
FIG. 3 is a block diagram used in explaining a second operation mode in the operation of the electric power supplying apparatus according to the first embodiment of the present disclosure.

Second operation mode: as shown in FIG. 3, both of commercial utility electric power AC1 which is formed by passing both of the AC-DC converter 3 and the DC-AC inverter 4, and an A.C. electric power AC2 which is formed by passing the DC-AC inverter 4 after the boosting of the output from the battery module 6 are mixed with each other. The mixture is carried out on the output side of the AC-DC converter 3 based on the D.C. signal. Both of the switches SW1 and SW3 are turned ON, and the switch SW2 is turned OFF. In addition, the charging circuit 5 is turned OFF and the boosting circuit 7 is turned ON. In the following description, the second operation mode will be referred to as "a discharging priority mixture mode."

Figure 4:
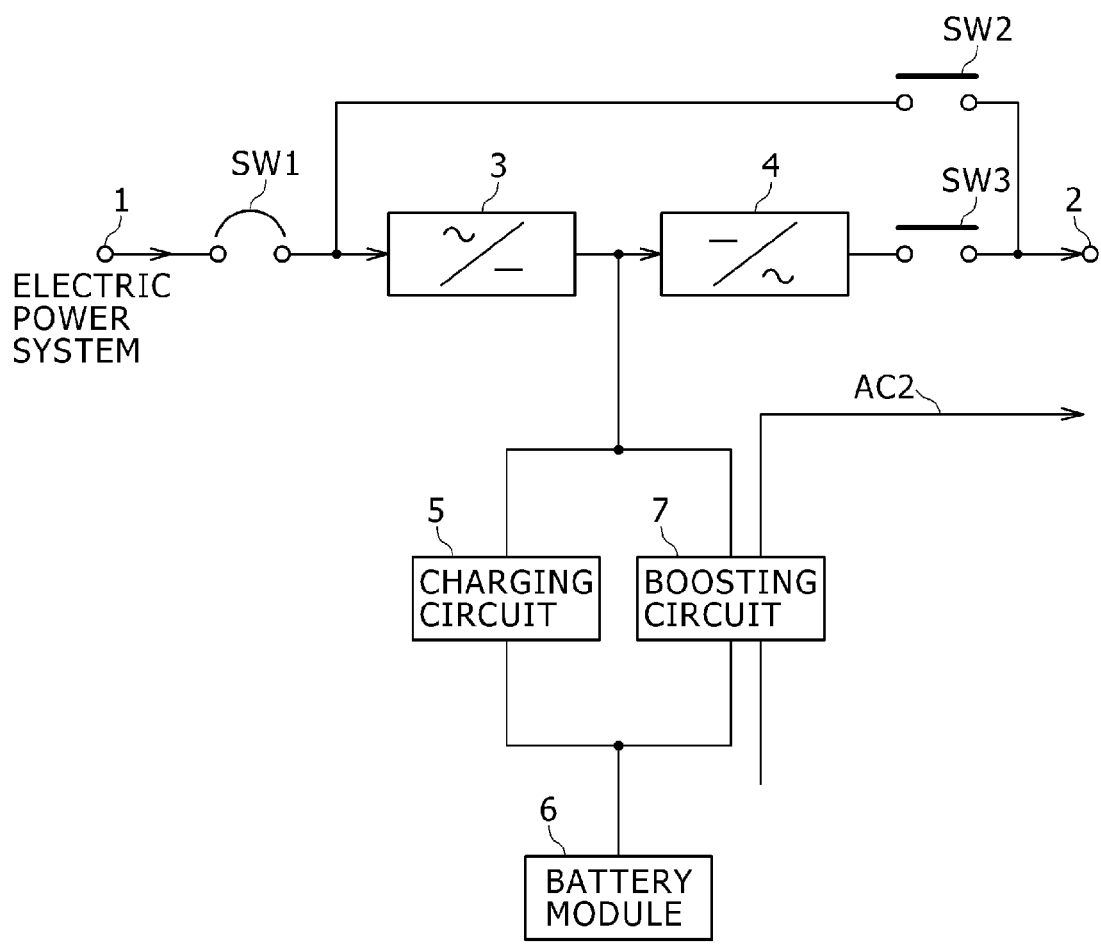
FIG. 4 is a block diagram used in explaining a third operation mode in the operation of the electric power supplying apparatus according to the first embodiment of the present disclosure.

Third operation mode: as shown in FIG. 4, only the output from the battery module 6 is used. The A.C. electric power AC2 which is formed by the DC-AC inverter 4 after the boosting of the output from the battery module 6 is used as an A.C. power source output. The same operation as that in the UPS is carried out in the third operation mode, and the third operation mode is an operation mode which is effective in the electric power outage or the like. In the case as well where the battery module 6 is charged with the electricity from the relatively inexpensive electric power like a nighttime electric power without being limited to the phase of the electric power outage, the running in the third operation mode is carried out in accordance with the discharging command in some cases. Both of the switches SW1 and SW3 are turned ON, and the switch SW2 is turned OFF. In addition, both of the AC-DC converter 3 and the charging circuit 5 are turned OFF, and both of the DC-AC inverter 4 and the boosting circuit 7 are turned ON. In the following description, the third operation mode will be referred to as "a discharging priority mode."

Figure 5:
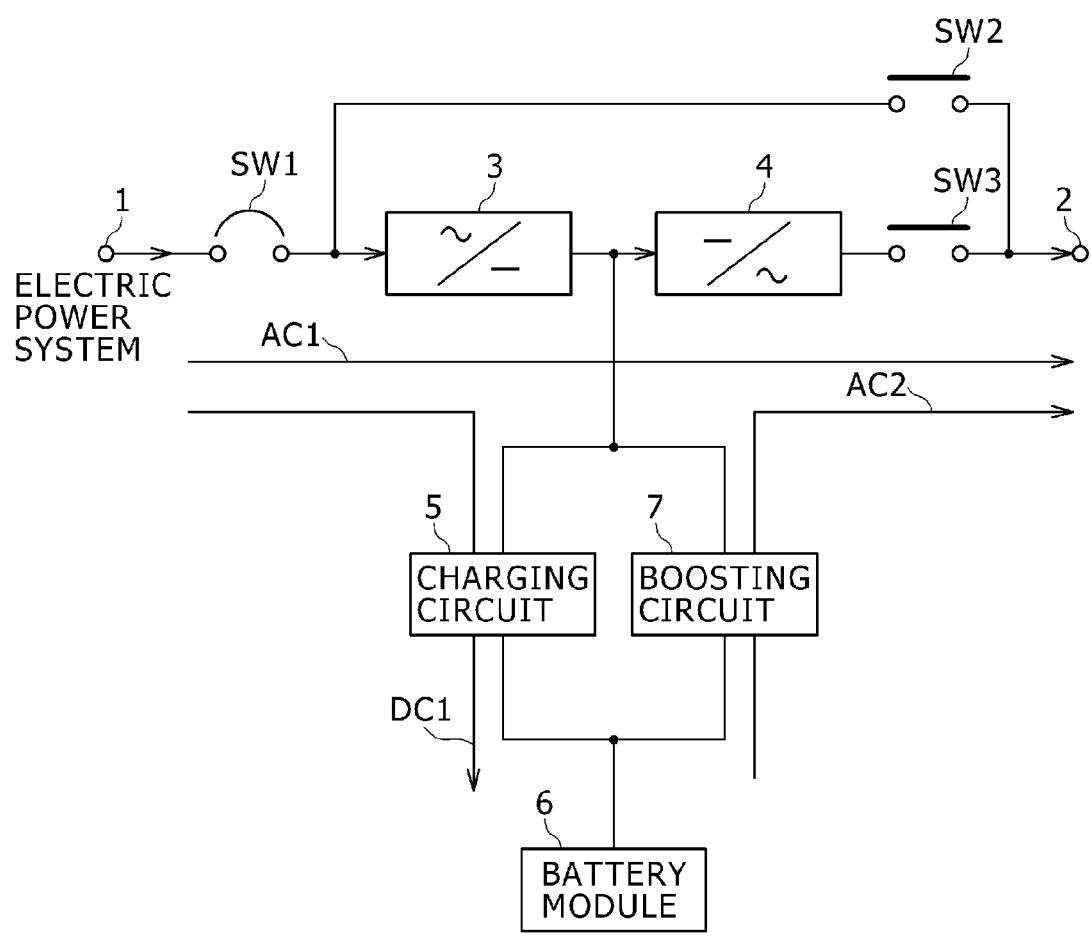
FIG. 5 is a block diagram used in explaining a fourth operation mode in the operation of the electric power supplying apparatus according to the first embodiment of the present disclosure.

Fourth operation mode: as shown in FIG. 5, a fourth operation mode is an operation mode in which both of the charging priority mode and the discharging priority mixture mode are present in accordance with the load electric power. That is to say, a threshold value electric power is previously set. When the load electric power is less than the threshold value electric power, only the commercial utility electric power AC1 which is formed by passing both of the AC-DC converter 3 and the DC-AC inverter 4 is supplied to the load. Also, the battery module 6 is charged with the electricity from a D.C. output DC1 from the AC-DC converter 3. On the other hand, when the load electric power is equal to or more than the threshold value electric power, the commercial utility electric power AC1, and the A.C. electric power AC2 which is formed by passing the DC-AC inverter 4 after the boosting of the output from the battery module 6 are mixed with each other. The mixture is carried out on the output side of the AC-DC converter 3 based on the D.C. signal. Both of the switches SW1 and SW3 are turned ON, and the switch SW2 is turned OFF. In addition thereto, in the charging priority mode, the charging circuit 5 is turned ON, and the boosting circuit 7 is turned OFF. In the discharging priority mixture mode, the charging circuit 5 is turned OFF, and the boosting circuit 7 is turned ON. In the following description, the fourth operation mode will be referred to as "a peak shift mode."

Figure 6:
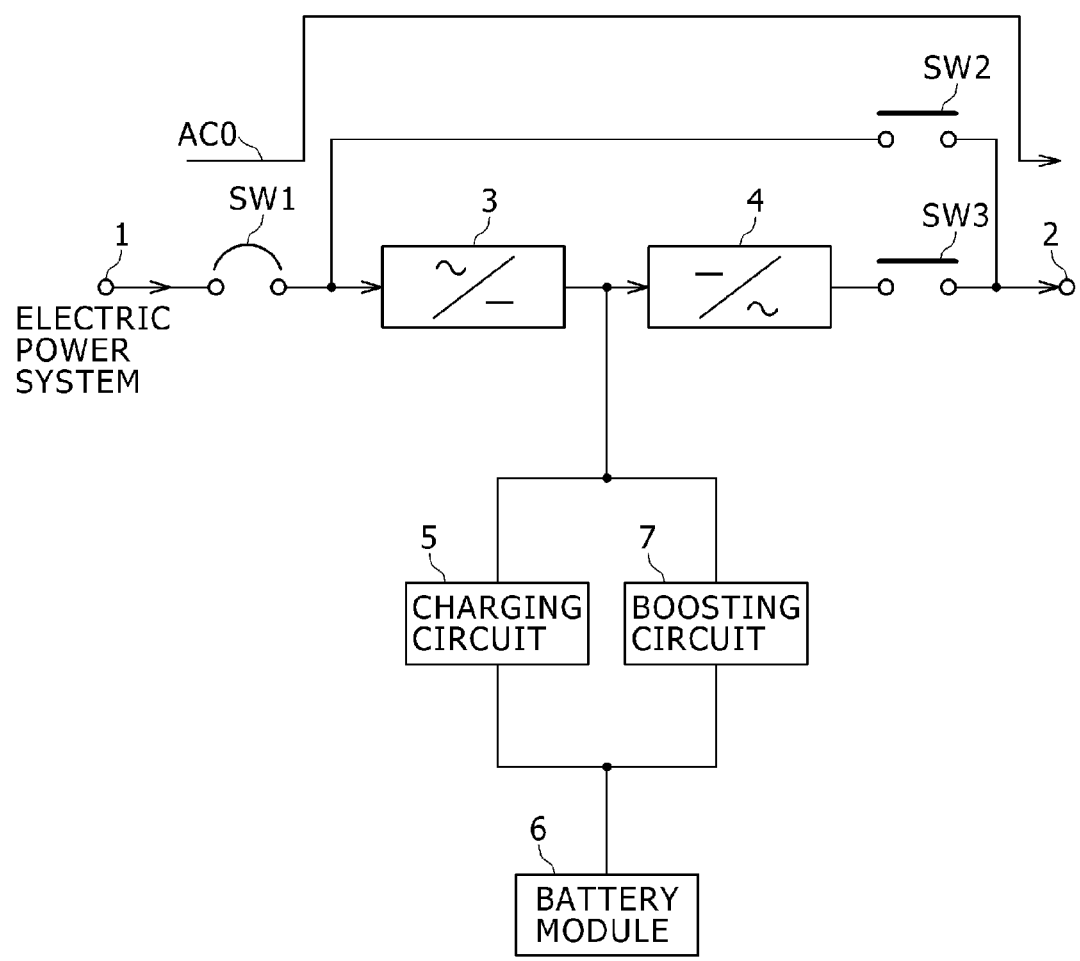
FIG. 6 is a block diagram used in explaining a fifth operation mode in the operation of the electric power supplying apparatus according to the first embodiment of the present disclosure.

Fifth operation mode: as shown in FIG. 6, a fifth operation mode is an operation mode in which the input commercial utility electric power AC0 is fetched to the A.C. electric power supply terminal 2 as it is. Both of the switches SW1 and SW2 are turned ON, and the switch SW3 is turned OFF. The operation states of the individual circuits are set as the ON state. In the following description, the fifth operation mode will be referred to as "a bypass mode." When some sort of abnormality is detected, the operation mode is automatically switched over to the bypass mode. Also, when some sort of abnormality is dissolved, the operation mode automatically returns back to the original operation mode.

Exchange of the battery module, and a maintenance bypass mode for maintenance of checking or the like for a fan can be carried out as changes of the bypass mode. The maintenance bypass mode is an operation mode in which the power source for the individual portions such as the AC-DC converter 3, the DC-AC inverter 4, the charging circuit 5, and the boosting circuit 7 is tuned OFF, and the input commercial utility electric power AC0 is fetched to the A.C. electric power supply terminal 2 as it is.

[Control by Controller]

Figure 7:
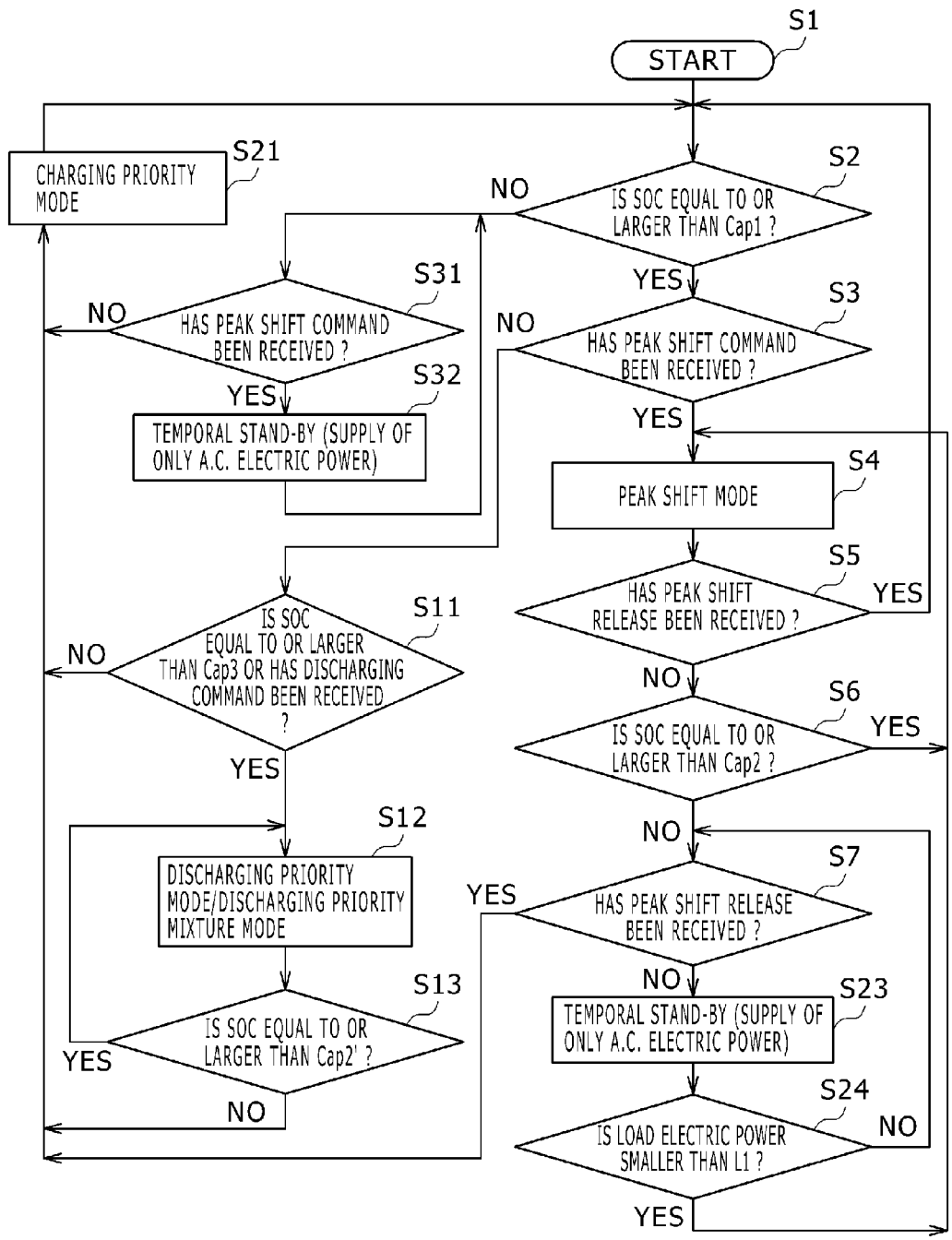
FIG. 7 is a flow chart used in explaining the operation of the electric power supplying apparatus according to the first embodiment of the present disclosure.

For the purpose of switching the operation modes described above over to one another, the controller 8 carries out the control in accordance with a flow chart shown in FIG. 7. The remaining capacity of the battery module 6 is present as one factor for the switching of the operation modes. In FIG. 7, the remaining capacity of the battery module 6 is expressed in the form of a State Of Charge (SOC). As an example, Cap1, Cap2, and Cap3 are set as the threshold values for the remaining capacity. In this case, a relationship of (Cap3>Cap1>Cap2) (or Cap2') holds. The threshold value Cap2, and the threshold value Cap2' may be the same value or may be different from each other. In addition, the bypass mode (including the bypass maintenance mode) is a running mode which is carried out for the case where the abnormality of the system is detected, or the maintenance is carried out. Therefore, predetermined pieces of processing for the bypass mode are omitted in FIG. 7. Also, predetermined pieces of processing for the case where the operation mode becomes the discharging priority mode due to the detection of the electric power outage are also omitted in FIG. 7.

The threshold value Cap3, for example, is set to 80%, and the case where the remaining capacity is equal to or larger than the threshold value Cap3 means that the remaining capacity is sufficient. Also, the threshold value Cap2, for example, is set to 30%, and the case where the remaining capacity is equal to or smaller than the threshold value Cap2 means that the remaining capacity is insufficient, and thus the discharge is inhibited. The information on the remaining capacity is transmitted from the BMU 9 to the EMU 10.

When an operation is started in processing in Step S1, the operation proceeds to processing in Step S2 for determination.

Processing in Step S2: it is determined whether or not the remaining capacity of the battery module 6 is equal to or larger than the threshold value Cap1.

Processing in Step S31: when the remaining capacity of the battery module 6 is smaller than the threshold value Cap1, it is determined whether or not the peak shift command has been received (including whether or not the peak shift command is being received).

Processing in Step S32: when the peak shift command has been received, the operation proceeds to processing for temporal stand-by (processing in Step S32), and the determination processing in Step S31 is executed. At this time, since the remaining capacity is less, only the A.C. electric power which is formed from the commercial utility electric power is supplied to the load.

Processing in Step S21: when the peak shift command has not been received, the operation mode becomes the charging priority mode because it is necessary to charge the battery module 6 with the electricity.

Processing in Step S3: it is determined whether or not the peak shift command has been received.

Processing in Step S4: when it is determined that the peak shift command has been received, the operation mode becomes the peak shift mode.

Processing in Step S5: it is determined whether or not a peak shift release command has been received. For example, the peak shift command is issued in a time zone in which the electric power demand which is previously set by a personal computer of a home controller is much, and after a lapse of the time zone, the peak shift command is released. If it is determined that the peak shift release command has been received, then the operation returns back to the processing in Step S2 (start).

Processing in Step S6: when the peak shift release command has not been received, it is determined whether or not the remaining capacity is equal to or larger than the threshold value Cap2. When it is determined that the remaining capacity is equal to or larger than the threshold value Cap2, the operation returns back to the processing in Step S4 (peak shift mode).

Processing in Step S7: when it is determined in the processing in Step S6 that the remaining capacity is smaller than the threshold value Cap2, it is necessary to immediately charge the battery module 6 with the electricity. However, if the peak shift mode is still being carried out, then the peak is increased when the operation mode proceeds to the charging priority mode. Therefore, it is determined whether or not the peak shift release command has been received. When it is determined that the peak shift release command has been received, the operation returns back to the processing in Step S21 (charging priority mode), and the battery module 6 is charged with the electricity.

Processing in Step S23: when it is determined in the processing in Step S7 that the peak shift release command has not been received, the temporal stand-by is set. At this time, since the remaining capacity is less, only the A.C. electric power which is formed from the commercial utility electric power is supplied to the load. In this case, the operation mode may be switched over to the bypass mode, thereby outputting the A.C. electric power.

Processing in Step S24: after completion of the temporal stand-by in the processing in Step S23, it is determined whether or not the load electric power is smaller than the threshold value electric power L1 previously set. When the load electric power is smaller than the threshold value electric power L1, the operation returns back to the processing in Step S4 (peak shift mode). On the other hand, when the load electric power is equal to or larger than the threshold value electric power L1, the operation returns back to the processing in Step S7 (the determination as to presence or absence of the reception of the peak shift release command).

Processing in Step S21: when it is determined in the processing in Step S2 that the remaining capacity is smaller than the threshold value Cap1, since it is necessary to charge the battery module 6 with the electricity, the operation mode proceeds to the charging priority mode. The charging priority mode is continuously carried out until it is determined that the remaining capacity is equal to or larger than the threshold value Cap1.

Processing in Step S11: when it is determined in the processing in Step S3 that the peak shift command has not been received, it is determined whether or not the remaining capacity is equal to or larger than the threshold value Cap3 or the discharging command has been received. When it is determined that the remaining capacity is smaller than the threshold value Cap3 or the discharging command has not been received, the operation proceeds to the processing in Step S21 (charging priority mode).

Processing in Step S12: when it is determined that the remaining capacity is equal to or larger than the threshold value Cap3 or the discharging command has been received, the operation mode proceeds either to the discharging priority mode or to the discharging priority mixture mode. Which of the discharging priority mode or the discharging priority mixture mode is selected is suitably carried out by the user, an electric power company or the like.

Processing in Step S13: it is determined whether or not the remaining capacity is equal to or larger than the threshold value Cap2'. When it is determined that the remaining capacity is equal to or larger than the threshold value Cap2', the discharging priority mode is continuously carried out. On the other hand, when it is determined that the remaining capacity is smaller than the threshold value Cap2', the operation proceeds to the processing in the charging priority mode in Step S21.

[Example of Charging Priority Mode]

An example of the charging priority mode will now be described with reference to FIG. 8. In the charging priority mode, as previously stated with reference to FIG. 2, the commercial utility electric power AC1 is supplied to the load, and the battery module 6 is charged with the electricity from a D.C. electric power DC1 formed from the commercial utility electric power. In this case, preferably, the battery module 6 is charged with the electricity from the relatively inexpensive electric power such as the nighttime electric power.

Figure 8:
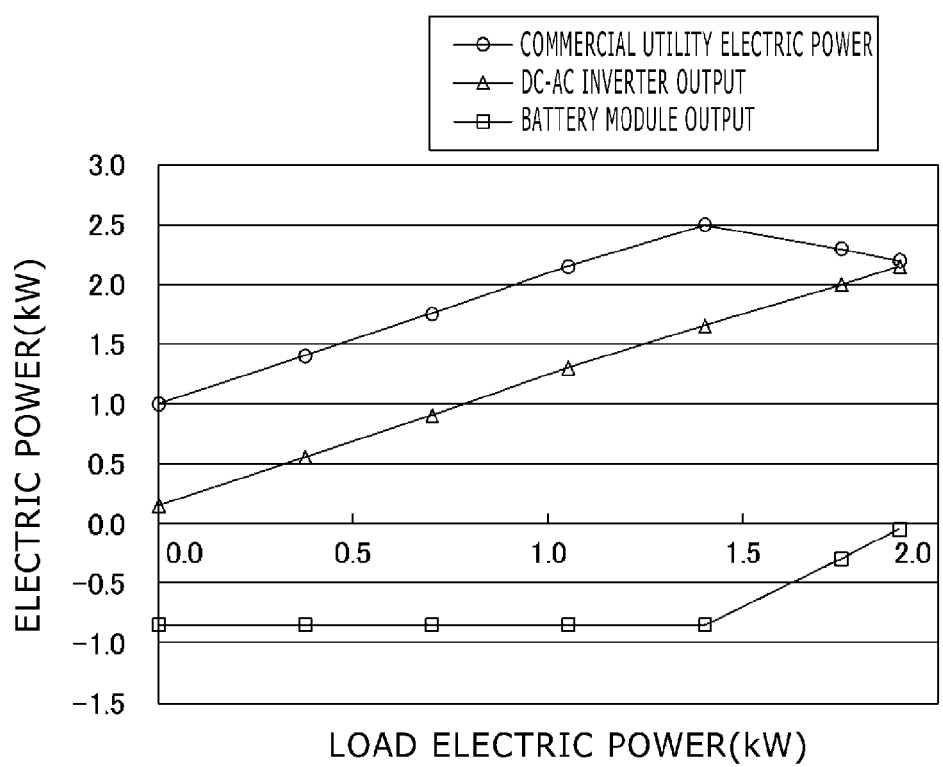
FIG. 8 is a graph used in explaining an example of the first operation mode according to the first embodiment of the present disclosure.

In FIG. 8, an axis of abscissa represents a change in the load electric power (kW). Also, an axis of ordinate represents changes in the output electric power (kW) from the commercial utility power source, an output electric power (kW) from an inverter, and the output electric power (kW) from the battery module 6 when the load electric power is changed. In addition, a straight line connecting circle dots represents the change in the commercial utility electric power AC1. A straight line connecting triangle dots represents the change in the output electric power (A.C. output electric power) from the DC-AC inverter 4. Also, a straight line connecting square dots represents the change in the output electric power from the battery module 6. The output electric power from the inverter becomes a value which is obtained by multiplying the input electric power by an efficiency (smaller than 1) of the inverter. The fact that the electric power is shifted to a negative side in the change in the output electric power from the battery module 6 represents that the battery module 6 is charged with the electricity. This also applies to descriptions given with reference to FIGS. 9 to 11 which will be described later. It is noted that the EMU 10 of the controller 8 holds therein a control table which is expressed in the form of graphs of FIGS. 8 to 11, and carries out the control for the mode switching or the like with reference to the control table in accordance with the load.

The example shown in FIG. 8 is an example in which the running is carried out with the commercial utility electric power of 2.5 kVA, and the remaining capacity (SOC) is 50%. Here, the running which is carried out with the commercial utility electric power of 2.5 kVA means the running in which the voltage of 100 V is made constant, and the current from the commercial utility power source is selected up to 25 A. Until the current from the commercial utility power source becomes up to 25 A, the commercial utility electric power is increased in correspondence to the load electric power, and the battery module 6 is charged with the electricity from a given electric power. When the load side output becomes a predetermined electric power (for example, the input current becomes up to 25 A), an amount of charging for the battery module 6 is gradually decreased, and the increase in the commercial utility electric power is not carried out. Although in the example, the control is carried out with the maximum commercial utility electric power, at which of the stages the control is carried out can be suitably set.

[Example of Discharging Priority Mixture Mode]

An example of the discharging priority mixture mode will now be described with reference to FIG. 9. In the discharging priority mixture mode, as previously stated with reference to FIG. 3, the commercial utility electric power AC1, and the A.C. electric power AC2 which is formed from the output from the battery module 6 are mixed with each other.

Figure 9:
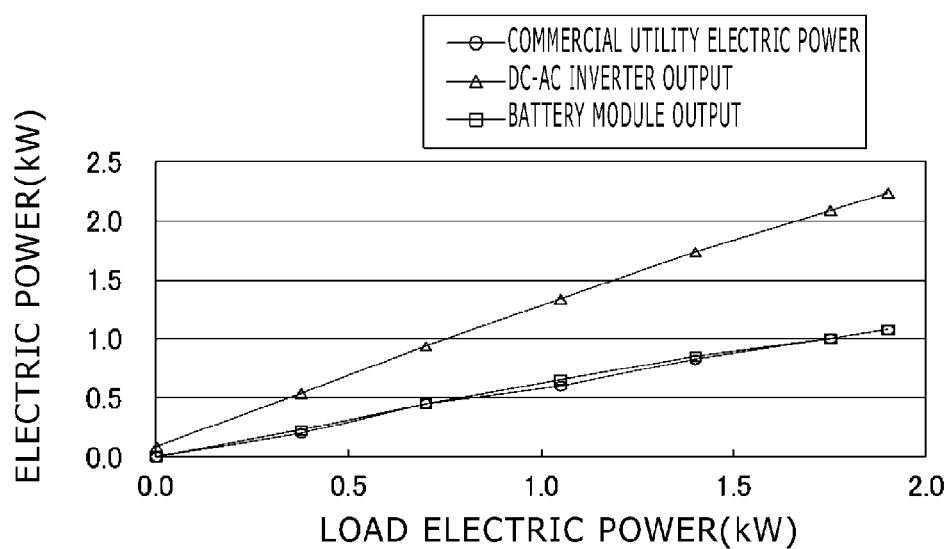
FIG. 9 is a graph used in explaining an example of the second operation mode according to the first embodiment of the present disclosure.

The example shown in FIG. 9 is an example in which the running is carried out with the commercial utility electric power of 2.5 kVA, and the remaining capacity (SOC) is 50%. In addition, a ratio of the commercial utility electric power to the A.C. electric power is set to 50%. The output electric power from the DC-AC inverter 4 becomes a value which is obtained by adding the commercial utility electric power and the A.C. electric power to each other, and the commercial utility electric power and the A.C. electric power are both increased in correspondence to the increase in the load electric power. It is noted that the mixture ratio of 50% is merely an example, and thus the mixture ratio can be suitably set. The mixture ratio is set based on the remaining capacity of the battery module 6. Thus, when the remaining capacity of the battery module 6 is less, the rate of the A.C. electric power formed from the output from the battery module 6 becomes low accordingly.

[Example of Discharging Priority Mode]

Figure 10:
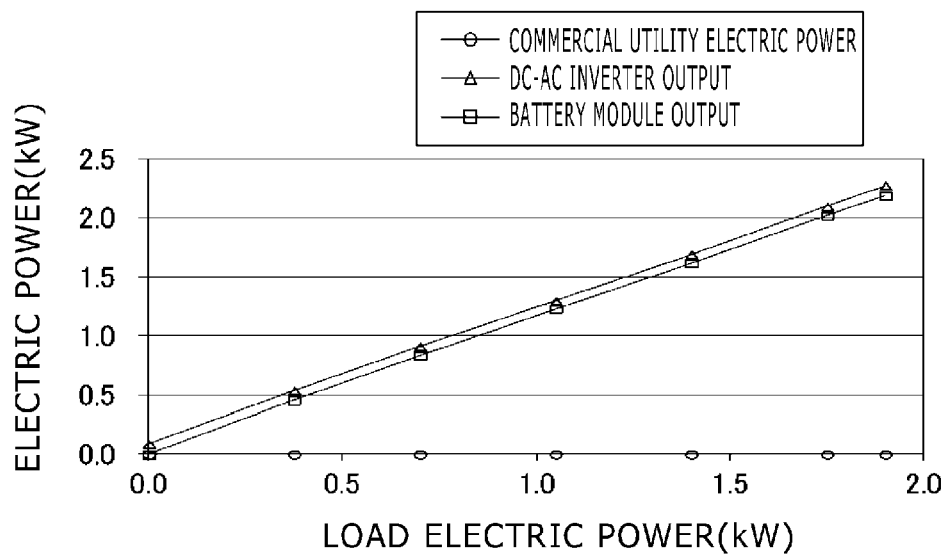
FIG. 10 is a graph used in explaining an example of the third operation mode according to the first embodiment of the present disclosure.

An example of the discharging priority mode will now be described with reference to FIG. 10. In the discharging priority mode, as previously stated with reference to FIG. 4, only the A.C. electric power AC2 which is formed from the output from the battery module 6 is supplied as the A.C.

electric power to the load. In the discharging priority mode, only the output electric power from the battery module 6 is outputted. The discharging priority mode is identical in function to the so-called UPS, and enables the supply of the electric power in the phase of the electric power outage to be carried out. In addition, for the purpose of charging the battery module 6 with the electricity from the inexpensive electric power such as the nighttime electric power, the operation mode is switched over to the discharging priority mode without being limited to the phase of the electric power outage. The example shown in FIG. 10 is an example in which the running is carried out with the commercial utility electric power of 2.5 kVA, and the remaining capacity (SOC) is 80%. In this case, the commercial utility electric power is set to 0 and thus the discharging electric power of the battery module 6 becomes 100%.

[Example of Peak Shift Mode]

An example of the peak shift mode will now be described with reference to FIG. 11. The peak shift mode, as previously stated with reference to FIG. 5, is the operation mode in which both of the charging priority mode and the discharging priority mixture mode are present in correspondence to the load electric power.

Figure 11:
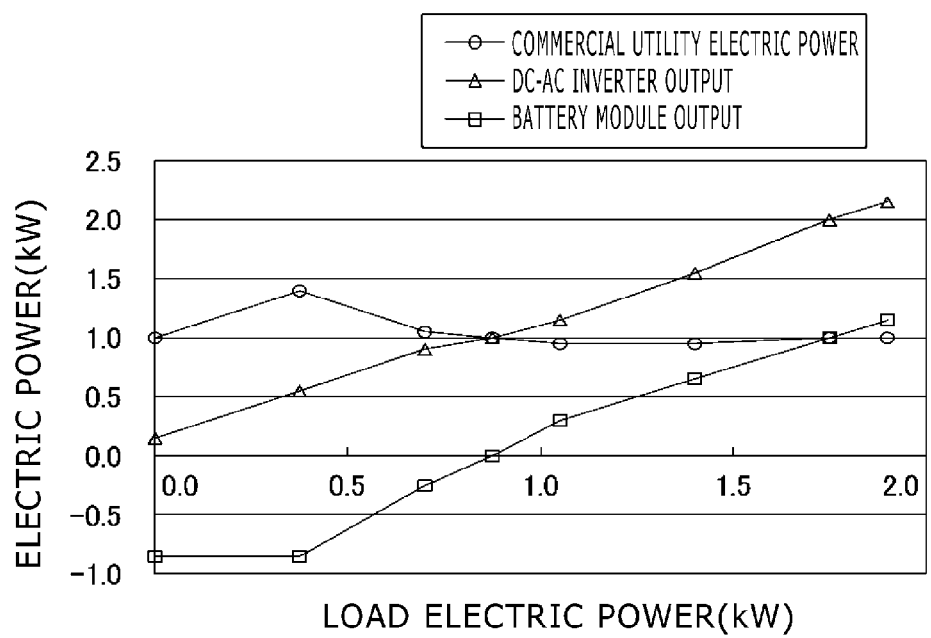
FIG. 11 is a graph used in explaining an example of the fourth operation mode according to the first embodiment of the present disclosure.

The example shown in FIG. 11 is an example in which the running is carried out with the commercial utility electric power of 2.5 kVA, and the remaining capacity (SOC) is 50%. In addition, in the discharging priority mixture mode, a ratio of the commercial utility electric power to the A.C. electric power is set to 50%. That is to say, until the load electric power becomes equal to the electric power L1 as the threshold value previously set, the operation mode is continuously set as the charging priority mode. When the load electric power exceeds the electric power L1 as the threshold value, the operation mode is switched over to the discharging priority mixture mode. As an example, the threshold value electric power L1, for example, is set to a value (0.88 kW) of 50% of 1.75 kW.

In addition, in the charging priority mode, until the input electric power becomes equal to the predetermined value, the commercial utility electric power is increased so as to correspond to the load electric power, and the battery module 6 is charged with the electricity from the given electric power. When the load electric power becomes equal to the predetermined electric power, an amount of charging for the battery module 6 is gradually decreased, and the increase in the commercial utility electric power is not carried out. When the load electric power exceeds the threshold value electric power L1, so that the operation mode proceeds to the discharging priority mixture mode, the commercial utility electric power, and the A.C. electric power which is formed from the output from the battery module 6 are mixed with each other. The ratio of the mixture is set in correspondence to the remaining capacity of the battery module 6.

<2. Second Embodiment>

Figure 12:
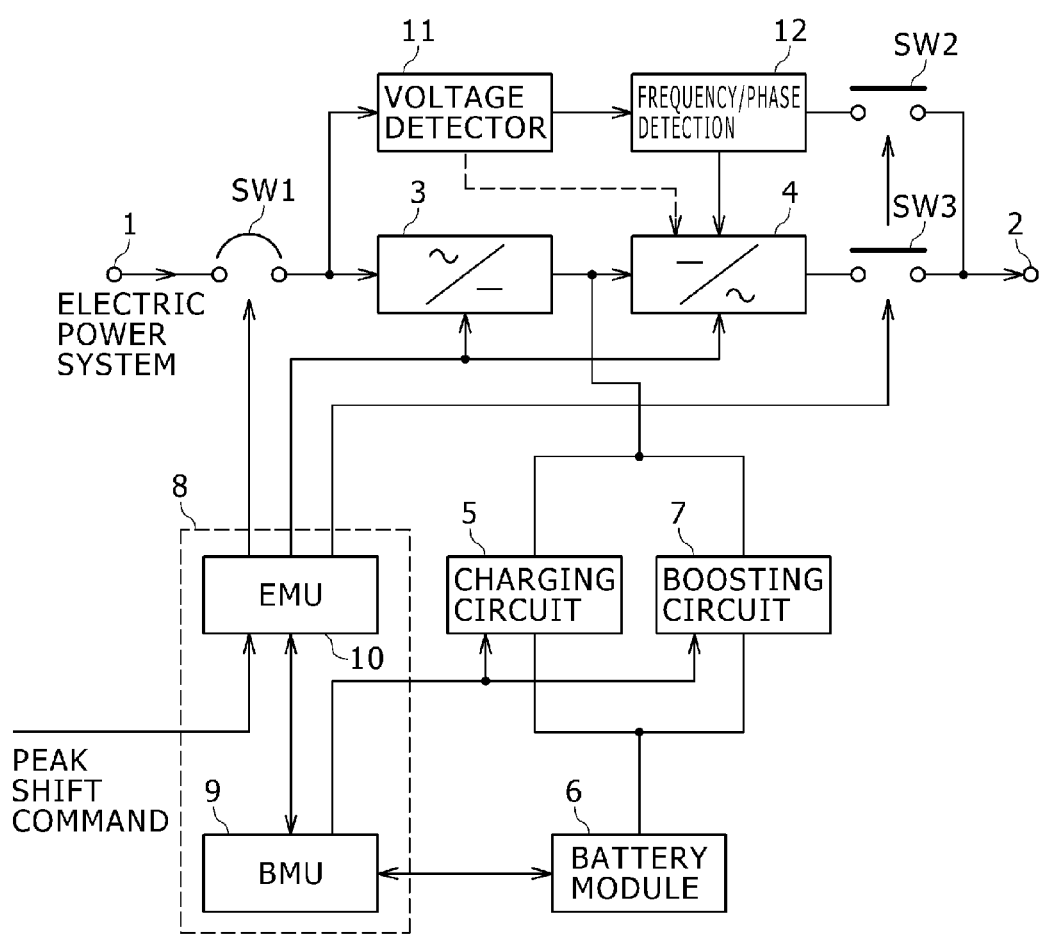
FIG. 12 is a block diagram showing a configuration of an electric power supplying apparatus according to a second embodiment of the present disclosure.

In the first embodiment described above, when a commercial utility electric power, and an A.C. output electric power from a battery module 6 are mixed with each other, the mixture of the D.C. signals is carried out between the AC-DC converter 3 and the DC-AC inverter 4. In an electric power supplying apparatus according to a second embodiment of the present disclosure, as shown in FIG. 12, the mixture of the A.C. signals is carried out.

The commercial utility electric power is mixed with an output electric power from the switch SW3 through the switch SW1, a voltage detector 11, a frequency/phase detector 12, and the switch SW2, and the resulting mixture output electric power is fetched to the A.C. electric power supply terminal 2. The D.C. output electric power from the battery module 6 is supplied to the DC-AC inverter 4 through the boosting circuit 7. Also, the output A.C. electric power from the DC-AC inverter 4 is mixed with the commercial utility electric power through the switch SW3.

A detection output from the frequency/phase detector 12 is supplied to the DC-AC inverter 4, so that the A.C. electric power generated from the DC-AC inverter 4 agrees in frequency and phase with the commercial utility electric power. The DC-AC inverter 4, for example, is composed of a Phase Locked Loop (PLL), a pulse generator, and a transformer. The commercial utility electric power is supplied to the PLL, and thus a pulse signal which is in phase with the commercial utility electric power is generated by the PLL. In addition, since the detection output from the voltage detector 11 is supplied to the DC-AC inverter 4, even when the voltage level of the commercial utility electric power is changed, it is possible to previously set the mixture ratio.

<3. Third Embodiment>

Next, a third embodiment of the present disclosure will now be described. In the first and second embodiments described above, both of the commercial utility electric power and the output electric power from the battery module are mixed with each other, and the running is carried out with the resulting mixture electric power. An electric power supplying apparatus according to a third embodiment of the present disclosure further uses an electric power generating apparatus which uses a recyclable energy.

Figure 13:
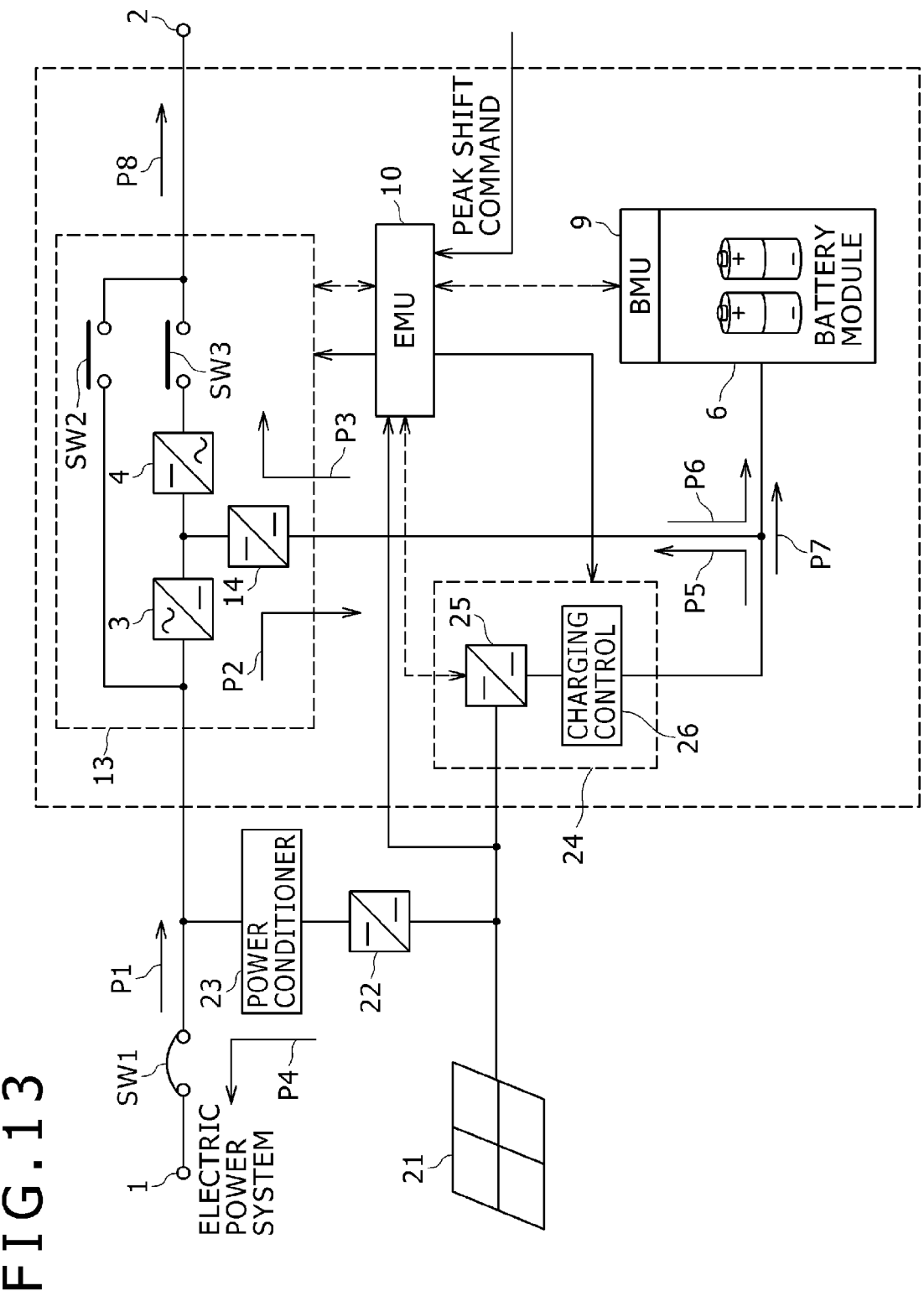
FIG. 13 is a block diagram showing a configuration of an electric power supplying apparatus according to a third embodiment of the present disclosure.

FIG. 13 shows a system configuration of the electric power supplying apparatus according to the third embodiment of the present disclosure. Here, in FIG. 13, constituent elements corresponding to those of the electric power supplying apparatuses of the first and second embodiments are designated by the same reference numerals or symbols, respectively. The commercial utility electric power is supplied to the input terminal 1, and is then inputted to a UPS portion 13 surrounded by a broken line. The UPS portion 13, similarly to the cases of the first and second embodiments described above, is composed of the AC-DC converter 3, the DC-AC inverter 4, the switch SW2, and the switch SW3. The commercial utility electric power P1 is supplied to the UPS portion 13.

A DC-DC converter 14 is connected between a connection point, between the output terminal of the AC-DC converter 3 and the input terminal of the DC-AC inverter 4, and the battery module 6. The DC-DC converter 14 is bidirectional one. That is to say, a D.C. electric power P2 which is formed from the commercial utility electric power by the AC-DC converter 3 is supplied as the charging electric power to the battery module 6 through the DC-DC converter 14. On the other hand, a discharging electric power P3 from the battery module 6 is supplied to the DC-DC converter 14. The output from the DC-DC converter 14 is supplied to the DC-AC inverter 4. Also, the A.C. electric power is fetched from the DC-AC inverter 4 to the A.C. electric power supply terminal 2 through the switch SW3. The AC-DC converter 3, the DC-AC inverter 4, the DC-DC converter 14, the switch SW2, and the switch SW3 compose the UPS portion 13.

A solar cell module 21 is installed in a roof, outdoors or the like. The solar cell module 21 is structured in such a way that plural solar cells are connected to one another in a panel. The solar cell module 21 is referred to as a solar panel as well. Normally, plural sheets of solar cell modules 21 are arranged and installed, thereby structuring a solar cell array.

An output electric power P4 from the solar cell module 21 is supplied to an electric power supply line of the external electric power system through both of the DC-DC converter 22 and a power conditioner 23. The power conditioner 23 includes an electric power converting portion composed of a DC-DC converter portion and a DC-AC inverter portion. The DC-DC converter portion boosts the input D.C. voltage and supplies the resulting D.C. voltage to the DC-AC inverter portion. The DC-AC inverter portion converts the D.C. voltage from the DC-DC conversion portion into an A.C. electric power. In addition, the power conditioner 23 carries out control referred to as "Maximum Power Point Tracking (MPPT)." This control corresponds to a system in which a change in a generated electric power in the solar cell module 21 is followed to track a maximum electric power on a continuous basis.

Since an output terminal of the power conditioner 23 is connected to the electric power supply line of the external electric power system, a generated electric power (surplus electric power) P4 of the solar cell module 21 is sold. The selling of the surplus electric power is referred to as reverse electric power flow. Although not illustrated, a meter for measuring the electric power of the reverse electric power flow is connected.

In addition thereto, the output electric power from the solar cell module 21 is supplied to a PV charger 24. The PV charger 24 includes a DC-DC converter 25 and a charging control portion 26. In this case, the output electric power from the solar cell module 21 is supplied to the DC-DC converter 25. An output electric power P5 from the charging control portion 26 is supplied to the UPS portion 13 and is used as a load electric power P8. Along with this, an output electric power P6 from the charging control portion 26 is supplied to the battery module 6. The DC-DC converter 14 of the UPS portion 13 described above is connected to the battery module 6. Thus, the battery module 6 is charged with the electricity from any one of the output electric power from the solar cell module 21 through the PV charger 24, and a commercial utility electric power P7 from the UPS portion 13.

It is noted that the battery module 6 is composed of a lithium-ion secondary battery, and is charged with the electricity at constant current (CC)/constant voltage (CV) in the phase of the charging. That is to say, at first, when the battery module is charged with the electricity from a predetermined current up to a predetermined voltage, the charging mode is switched over to constant voltage charging. Processing for controlling a value of a charging current is executed in accordance with charging control made by the PV charger 24.

The charging control for the battery module 6 is carried out by the EMU 10 which communicates with the BMU 9. The BMU 9 monitors the state (the remaining capacity, the battery voltage, the battery temperature, and the like) of the battery module 6, so that the suitable charging/discharging operation is carried out. Information, on the remaining capacity of the battery module 6, which the BMU 9 acquires is transmitted to the EMU 10 and is then used for the switching of the operation mode of the EMU 10. The EMU 10 controls the switch of the UPS portion 13, thereby controlling both of the AC-DC converter 3 and the DC-AC inverter 4. The EMU 10 monitors the output electric power from the solar cell module 21. When the solar cell module 21 is proved to be equal to or larger than a predetermined value, the battery module 6 is charged with the electricity from the output electric power from the PV charger 24.

Therefore, in the case like the daytime, the battery module 6 is charged with the electricity by the solar cell module 21.

The peak shift command is issued to the EMU 10. The peak shift command is automatically issued in a time zone in which a total electric power (load electric power) of the electric power consumed indoors becomes relatively large. Alternatively, the peak shift command may also be issued in a time zone set by the user. Or, a monitoring portion for monitoring an indoor electric power may be provided, and the peak shift command may be issued when almost all the indoor electric power exceeds a predetermined electric power. As an example, when the fear that the indoor electric power exceeds the contracted electric power contracted with the electric power provider is generated, the peak shift command is issued. In addition thereto, the peak shift command can also be issued in accordance with an electric power limit command issued from an electric power industry company. It is noted that although in the third embodiment, the BMU 9 and the EMU 10 are described as being provided separately from each other, the BMU 9 and the EMU 10 may also be realized by one microcomputer or the like to be integrated with each other.

In the third embodiment, an amount of charging, and the electric power on the load side are controlled in correspondence to an amount of generated electric power in the solar cell module 21, an amount of electric power storage in the battery module 6, the load, and the time zone. In addition, these electric powers are outputted in a mixture style as may be necessary. According to such a third embodiment, it becomes possible to carry out the effective utilization, of the peak shift and the battery module 6, which corresponds to an amount of generated electric power in the solar cell module 21.

TABLE 1 shows the operation modes in the third embodiments of the present disclosure.

TABLE 1

|  | absence of PV electric power generation | presence of PV electric power generation |
| --- | --- | --- |
| SOC > 80% | discharging priority mode second operation mode | reverse electric power flow priority mode PV + discharging priority mode |
| 80% ≥ SOC ≥ 30% | peak shift mode charging priority mode | PV + peak shift mode load small: electric power selling + charging load large: discharging PV + charging priority |
| SOC < 30% | charging priority mode | PV + discharging priority mode (when forced discharging command is issued, PV + discharging priority) |

As shown in TABLE 1, the operation modes are used differently in accordance with presence or absence of the amount of generated electric power in the solar cell module 21. When there is absence of the amount of generated electric power in the solar cell module 21, the same operation mode as that in the first embodiment described above can be carried out. When the SOC (State Of Charge) is larger than 80%, the operation mode is switched over to the discharging priority mode. When the SOC is smaller than 30%, the operation mode is switched over to the charging priority mode. Also, when the SOC is equal to or larger than 30%, and is equal to or smaller than 80%, the operation mode is switched over to the peak shift operation mode and the charging priority mode.

[Processing For Switching Operation Mode]

Figure 14:
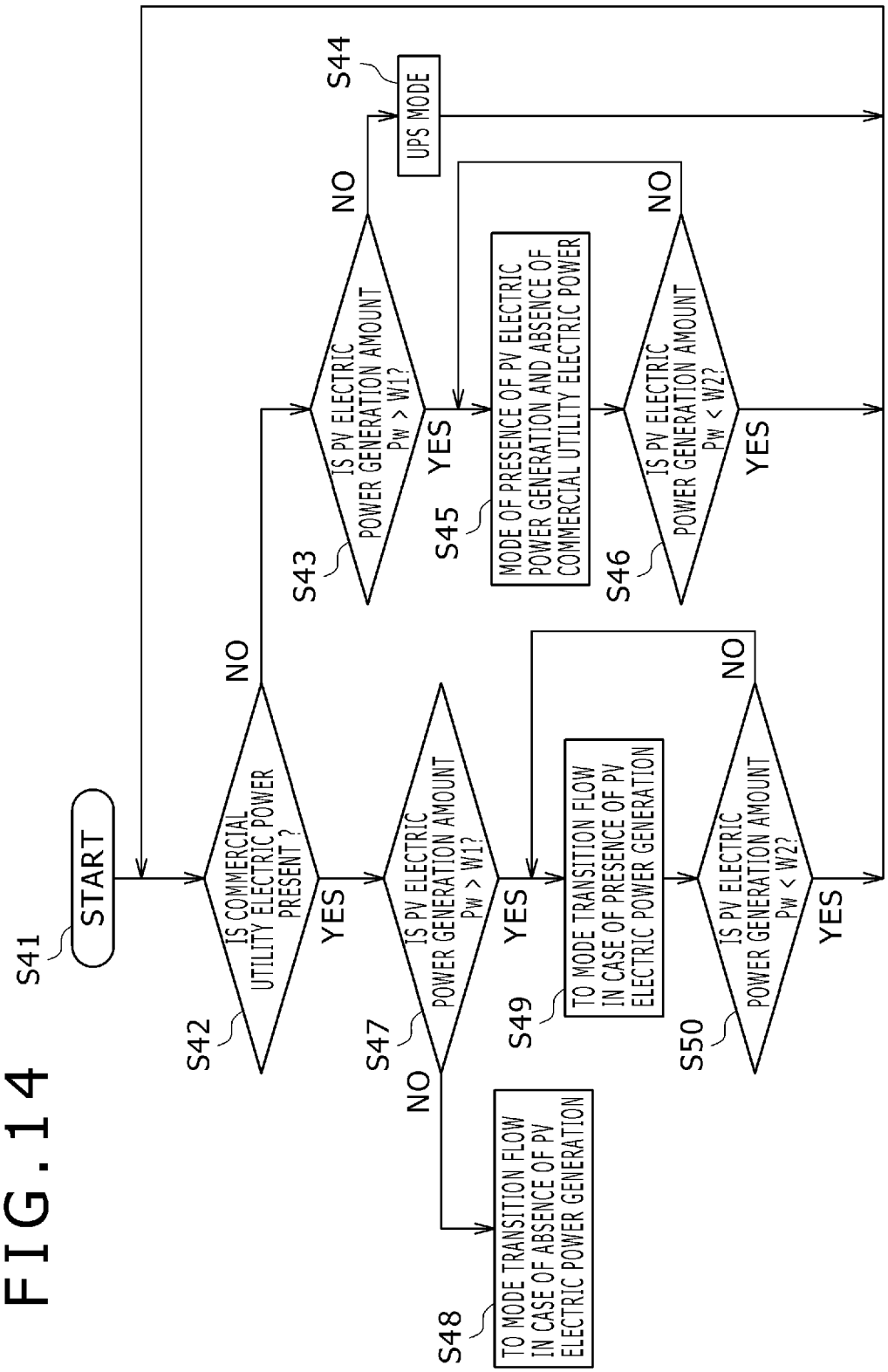
FIG. 14 is a flow chart explaining processing for determining presence or absence of PV (photovoltaic) electric power generation and a commercial utility electric power in the electric power supplying apparatus according to the third embodiment of the present disclosure.

Processing for switching the operation mode will now be described with reference to FIG. 14. The meanings of the following description, and the descriptions in FIG. 14 are as follows.

PV: the solar cell module.

Pw: an amount of generated electric power in the solar cell.

W1, W2: threshold values used to determine presence or absence of an amount of generated electric power in the solar cell module. In this case, a relationship of W1>W2 holds.

When an operation for executing processing for switching the operation mode is started in processing in Step S41, the operation proceeds to processing in Step S42 for determination.

Processing in Step S42: presence or absence of the commercial utility electric power (grid electric power) is determined.

Processing in Step S43: when it is determined in the processing in Step S42 that the commercial utility electric power is absent, it is determined whether or not the PV electric power amount Pw is larger than the threshold value W1.

Processing in Step S44: when it is determined in the processing in Step S43 that the PV electric power generation amount Pw is equal to or smaller than the threshold value W1, the operation mode is set to the UPS mode.

In the UPS mode, only the output electric power from the battery module 6 is used. The A.C. electric power which is obtained through the D/A conversion in the DC-AC converter 4 after the boosting of the output electric power from the battery module 6 by the DC-DC converter 14 is set as the A.C. power source output. The same operation as that in the UPS is carried out, and thus the UPS mode is an operation mode which is effective in the phase of the electric power outage or the like. In this case, the switch SW3 is turned ON, and the switch SW2 is turned OFF.

Processing in Step S45: when it is determined in the processing in Step S43 that the PV electric power generation amount Pw is larger than the threshold value W1, the operation mode proceeds to the mode of presence of PV electric power portion and absence of commercial utility electric power.

Processing in Step S46: it is determined whether or not the PV electric power generation amount Pw is smaller than the threshold value W2. In this case, the relationship of (W1>W2) holds. When it is determined in the processing in Step S46 that the PV electric power generation amount Pw is not smaller than the threshold value W2, the operation returns back to the processing in Step S45. On the other hand, when it is determined in the processing in Step S46 that the PV electric power generation amount Pw is smaller than the threshold value W2, the operation returns back to the processing in Step S42 (the processing in Step of a determination about presence or absence of the commercial utility electric power). When the number of the threshold values used to determine presence or absence of the PV electric power generation is set to 1 (for example, 0 kW), there is caused a problem that the threshold value is exceeded or not exceeded. Therefore, the different threshold values are set, thereby setting the hysteresis.

Processing in Step S47: when it is determined in the processing in Step S42 that the commercial utility electric power is present, it is determined whether or not the PV electric power generation amount Pw is larger than the threshold value W1.

Processing in Step S48: when it is determined in the processing in Step S47 that the PV electric power generation amount Pw is equal to or smaller than the threshold value W1, the operation proceeds to a mode transition flow in the case of absence of the PV electric power generation.

Processing in Step S49: when it is determined in the processing in Step S47 that the PV electric power generation amount Pw is larger than the threshold value W1, the operation proceeds to a mode transition flow in the case of presence of the PV electric power generation.

Processing in Step S50: it is determined whether or not the PV electric power generation amount Pw is smaller than the threshold value W2. When it is determined in the processing in Step S50 that the PV electric power generation amount Pw is not smaller than the threshold value W2, the operation returns back to the processing in Step S49. On the other hand, when it is determined in the processing in Step S50 that the PV electric power generation amount Pw is smaller than the threshold value W2, the operation returns back to the processing in Step S42 (the processing in Step of a determination about presence or absence of the commercial utility electric power).

[Mode Transition Flow in Case of Absence of PV Electric Power Generation]

Figure 15:
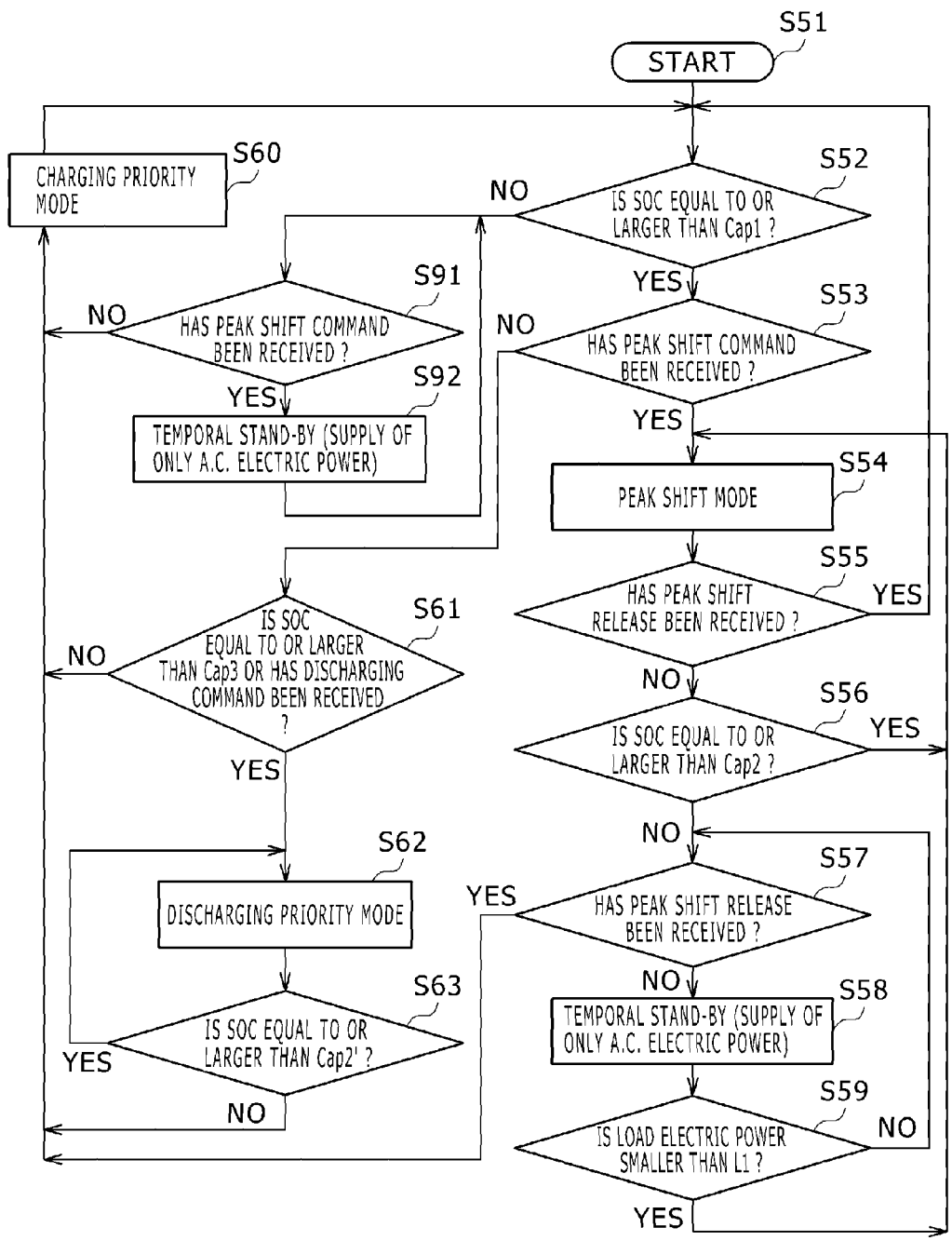
FIG. 15 is a flow chart explaining processing when the PV electric power generation is absent according to the third embodiment of the present disclosure.

The processing in Step S48 in FIG. 14, more specifically, is shown by a flow chart of FIG. 15. Similarly to the case of the first embodiment, with regard to the SOC (State Of Change) of the battery module 6, the threshold values Cap1, Cap2, and Cap3 are set. In this case, a relationship of (Cap3>Cap1>Cap2) (or Cap2') holds. The threshold value Cap2, and the threshold value Cap2' may be the same value or may be different from each other.

The threshold value Cap3, for example, is set to 80%, and the case where the remaining capacity is equal to or larger than the threshold value Cap3 means that the remaining capacity is sufficient. Also, the threshold value Cap2, for example, is set to 30%, and the case where the remaining capacity is equal to or smaller than the threshold value Cap2 means that the remaining capacity is insufficient, and thus the discharging is inhibited. The information on the remaining capacity is transmitted from the BMU 9 to the EMU 10.

When an operation is started in processing in Step S51, the operation proceeds to processing in Step S52 for determination.

Processing in Step S52: it is determined whether or not the remaining capacity of the battery module 6 is equal to or larger than the threshold value Cap1.

Processing in Step S91: when it is determined in the processing in Step S52 that the remaining capacity of the battery module 6 is smaller than the threshold value Cap1, it is determined whether or not the peak shift command has been received (including whether or not the peak shift command is being received).

Processing in Step S92: when it is determined in the processing in Step S91 that the peak shift command has been received, the operation proceeds to processing for temporal stand-by (processing in Step S92), and the determination processing in Step S91 is executed. At this time, since the remaining capacity is less, only the A.C. electric power which is formed from the commercial utility electric power is supplied to the load.

Processing in Step S60: when it is determined in the processing in Step S52 that the remaining capacity is smaller than the threshold value Cap1, it is necessary to charge the battery module 6 with the electricity. Therefore, the operation mode is switched over to the charging priority mode.

Processing in Step S53: it is determined whether or not the peak shift command has been received.

Processing in Step S54: when it is determined in the processing in Step S53 that the peak shift command has been received, the operation mode becomes the peak shift mode.

Processing in Step S55: it is determined whether or not a peak shift release command has been received. For example, the peak shift command is issued in a time zone in which the electric power demand which is previously set by a personal computer of a home controller is much, and after a lapse of the time zone, the peak shift command is released. If it is determined in the processing in Step S55 that the peak shift release command has been received, then the operation returns back to the processing in Step S52 (start).

Processing in Step S56: when it is determined in the processing in Step S55 that the peak shift release command has not been received, it is determined whether or not the remaining capacity is equal to or larger than the threshold value Cap2. When it is determined in the processing in Step S56 that the remaining capacity is equal to or larger than the threshold value Cap2, the operation returns back to the processing in Step S54 (peak shift mode).

Processing in Step S57: when it is determined in the processing in Step S56 that the remaining capacity is smaller than the threshold value Cap2, it is necessary to immediately charge the battery module 6 with the electricity. However, if the peak shift mode is still being carried out, then the peak is increased when the operation mode proceeds to the charging priority mode. Therefore, it is determined whether or not the peak shift release command has been received. When it is determined in the processing in Step S57 that the peak shift release command has been received, the operation returns back to the processing in Step S60 (charging priority mode), and the battery module 6 is then charged with the electricity.

Processing in Step S58: when it is determined in the processing in Step S57 that the peak shift release command has not been received, the temporal stand-by is set. At this time, since the remaining capacity is less, only the A.C. electric power which is formed from the commercial utility electric power is supplied to the load.

Processing in Step S59: after completion of the temporal stand-by in the processing in Step S58, it is determined in processing in Step S59 whether or not the load electric power is smaller than the threshold value electric power L1 previously set. When it is determined in the processing in Step S59 that the load electric power is smaller than the threshold value electric power L1, the operation turns back to the processing in Step S54 (peak shift mode). On the other hand, when it is determined in the processing in Step S59 that the load electric power is equal to or larger than the threshold value electric power L1, the operation turns back to the processing in Step S57 (the determination as to presence or absence of the reception of the peak shift release command).

Processing in Step S60: when it is determined in the processing in Step S52 that the remaining capacity is smaller than the threshold value Cap1, since it is necessary to charge the battery module 6 with the electricity, the operation mode proceeds to the charging priority mode. The charging priority mode is continuously carried out until it is determined in the processing in Step S52 that the remaining capacity is equal to or larger than the threshold value Cap1.

Processing in Step S61: when it is determined in the processing in Step S53 that the peak shift command has not been received, it is determined whether or not the remaining capacity is equal to or larger than the threshold value Cap3 or the discharging command has been received. When it is determined in the processing in Step S61 that the remaining capacity is smaller than the threshold value Cap3 or the discharging command has not been received, the operation proceeds to processing in Step S60 (charging priority mode).

Processing in Step S62: when it is determined in the processing in Step S61 that the remaining capacity is equal to or larger than the threshold value Cap3 or the forced discharging command has been received, the operation mode is switched over to the discharging priority mode. When SOC=0%, the running is carried out with a mixture of the output electric power from the solar cell module 21, and the commercial utility electric power.

Processing in Step S63: it is determined whether or not the remaining capacity is equal to or larger than the threshold value Cap2'. When it is determined in the processing in Step S63 that the remaining capacity is equal to or larger than the threshold value Cap2', the discharging priority mode is continuously carried out. On the other hand, when it is determined in the processing in Step S63 that the remaining capacity is smaller than the threshold value Cap2', the operation proceeds to the processing in the charging priority mode in Step S60.

A concrete example of the control which is carried out based on the mode transition flow in the case of absence of the PV electric power generation described above is the same as that in the first embodiment described above. In the case of the charging priority mode (the processing in Step S60), the control as described with reference to FIG. 8 is carried out.

That is to say, when as shown in FIG. 8, the running is carried out with the commercial utility electric power of 2.5 kVA, and the remaining capacity (SOC) is 50%, until the current from the commercial utility power source becomes up to 25 A, the commercial utility electric power is increased in correspondence to the load electric power, and the battery module 6 is charged with the electricity from a given electric power. Here, the running which is carried out with the commercial utility electric power of 2.5 kVA means the running in which the voltage of 100 V is made constant, and the current from the commercial utility power source is selected up to 25 A. When the load side output becomes a predetermined electric power (for example, the input current becomes up to 25 A), an amount of charging for the battery module 6 is gradually decreased, and the increase in the commercial utility electric power is not carried out. Although in the example, the control is carried out with the maximum commercial utility electric power, at which of the stages the control is carried out can be suitably set.

In the case of the discharging priority mode (the processing in Step S62), the control as described with reference to FIG. 9 is carried out. That is to say, as shown in FIG. 9, the commercial electric power AC1, and the A.C. electric power AC2 which is formed from the output electric power from the battery module 6 are mixed with each other. The example shown in FIG. 9 is an example in which the running is carried out with the commercial utility electric power of 2.5 kVA, and the remaining capacity (SOC) is 50%. In addition, a ratio of the commercial utility electric power to the A.C. electric power is set to 50%. The output electric power from the DC-AC inverter 4 becomes a value which is obtained by adding the commercial utility electric power and the A.C. electric power to each other, and the commercial utility electric power and the A.C. electric power are both similarly increased in correspondence to the increase in the load electric power. It is noted that the mixture ratio of 50% is merely an example, and thus the mixture ratio can be suitably set. The mixture ratio is set based on the remaining capacity of the battery module 6. Thus, when the remaining capacity of the battery module 6 is less, the rate of the A.C. electric power which formed from the output from the battery module 6 becomes low accordingly.

In the case of the peak shift mode (the processing in Step S54), the control as described with reference to FIG. 11 is carried out. That is to say, as shown in FIG. 11, the peak shift mode is the operation mode in which both of the charging priority mode and the discharging priority mixture mode are present in correspondence to the load electric power.

The example shown in FIG. 11 is an example in which the running is carried out with the commercial utility electric power of 2.5 kVA, and the remaining capacity (SOC) is 50%. In addition, in the discharging priority mixture mode, a ratio of the commercial utility electric power to the A.C. electric power is set to 50%. That is to say, until the load electric power becomes equal to the electric power L1 as the threshold value previously set, the operation mode is continuously set as the charging priority mode. When the load electric power exceeds the electric power L1, the operation mode is switched over to the discharging priority mixture mode. As an example, the threshold value electric power L1, for example, is set to a value (0.88 kW) of 50% of 1.75 kW.

In addition, in the charging priority mode, until the input electric power becomes equal to the predetermined value, the commercial utility electric power is increased so as to correspond to the load electric power, and the battery module 6 is charged with the electricity from the given electric power. When the load electric power becomes equal to the predetermined electric power, an amount of charging for the battery module 6 is gradually decreased, and the increase in the commercial utility electric power is not carried out. When the load electric power exceeds the threshold value electric power L1, so that the operation mode proceeds to the discharging priority mixture mode, the commercial utility electric power, and the A.C. electric power from the battery module 6 are mixed with each other. The ratio of the mixture is set in correspondence to the remaining capacity of the battery module 6.

[Mode Transition Flow in Case of Presence of PV Electric Power Generation]

Figure 16:
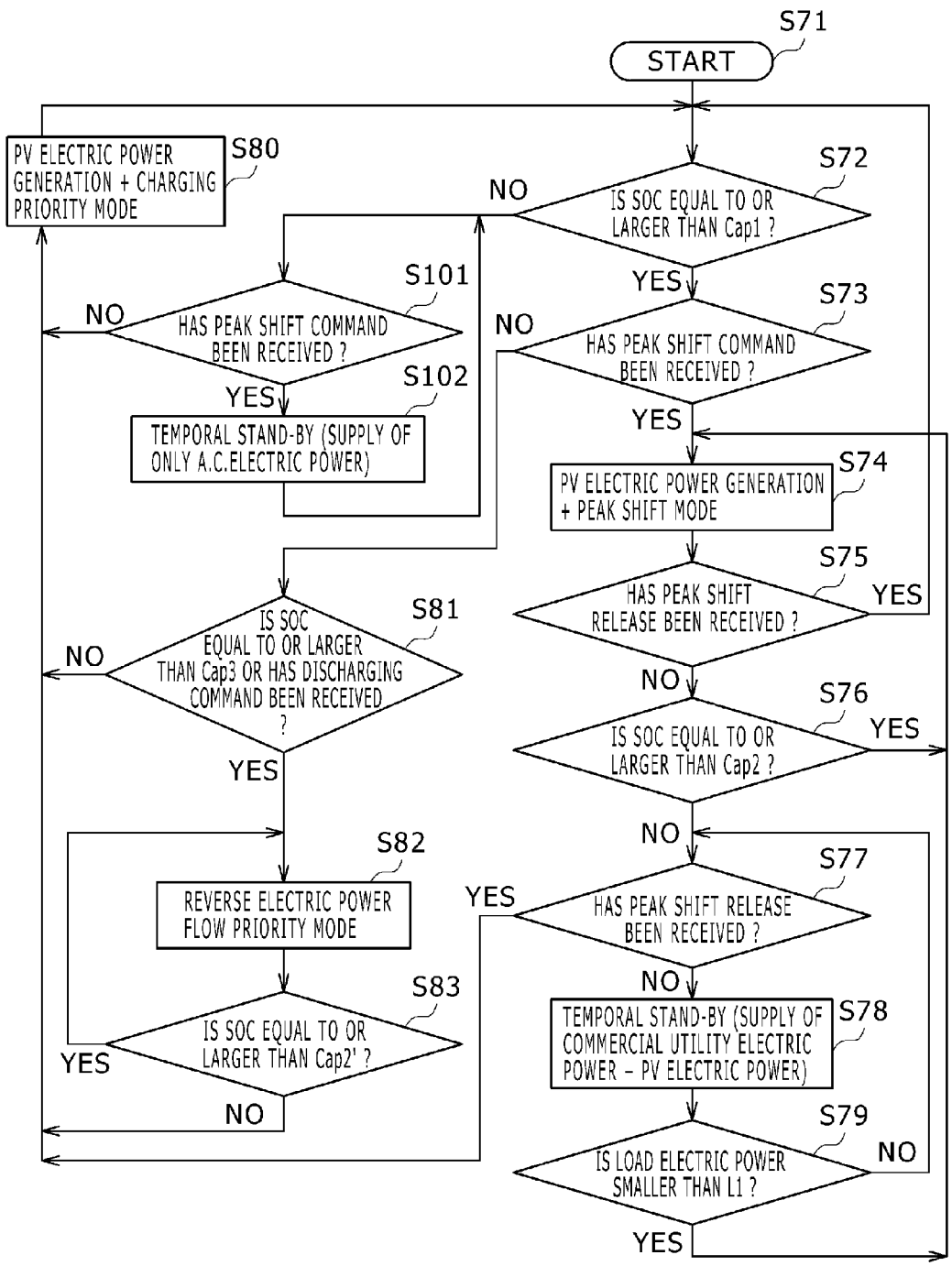
FIG. 16 is a flow chart explaining processing when the PV electric power generation is present according to the third embodiment of the present disclosure.

The processing in Step S49 in FIG. 14, more specifically, is shown by a flow chart of FIG. 16.

When an operation is started in processing in Step S71, the operation proceeds to processing in Step S72 for determination.

Processing S72: it is determined whether or not the remaining capacity of the battery module 6 is equal to or larger than the threshold value Cap1.

Processing in Step S101: when it is determined in the processing in Step S72 that the remaining capacity of the battery module 6 is smaller than the threshold value Cap1, it is determined whether or not the peak shift command has been received (including whether or not the peak shift command is being received).

Processing in Step S102: when it is determined in the processing in Step S101 that the peak shift command has been received, the operation proceeds to processing for temporal stand-by (the processing in Step S102), and the determination processing in Step S101 is executed. At this time, since the remaining capacity is small, only the A.C. electric power which is formed from the commercial utility electric power is supplied to the load.

Processing in Step S80: when it is determined in the processing in Step S72 that the remaining capacity of the battery module 6 is smaller than the threshold value Cap1, the operation mode becomes (the PV electric power generation+the charging priority mode) because it is necessary to charge the battery module 6 with the electricity.

Processing in Step S73: it is determined whether or not the peak shift command has been received.

Processing in Step S74: when it is determined in the processing in Step S73 that the peak shift command has been received, the operation mode becomes (the PV electric power generation+the peak shift mode).

Processing in Step S75: it is determined whether or not a peak shift release command has been received. For example, the peak shift command is issued in a time zone in which the electric power demand which is previously set by a personal computer of a home controller is much, and after a lapse of the time zone, the peak shift command is released. If it is determined in the processing in Step S75 that the peak shift release command has been received, then the operation returns back to the processing in Step S72 (start).

Processing in Step S76: when the peak shift release command has not been received, it is determined whether or not the remaining capacity is equal to or larger than the threshold value Cap2. When it is determined in the processing in Step S76 that the remaining capacity is equal to or larger than the threshold value Cap2, the operation returns back to the processing in Step S74 (PV electric power generation+peak shift mode).

Processing in Step S77: when it is determined in the processing in Step S76 that the remaining capacity is smaller than the threshold value Cap2, it is necessary to immediately charge the battery module 6 with the electricity. However, if the peak shift mode is still being carried out, then the peak is increased when the operation mode proceeds to the charging priority mode. Therefore, it is determined whether or not the peak shift release command has been received. When it is determined in the processing in Step S77 that the peak shift release command has been received, the operation returns back to the processing in Step S80 (PV electric power generation+charging priority mode), and the battery module 6 is then charged with the electricity.

Processing in Step S78: when it is determined in the processing in Step S77 that the peak shift release command has not been received, the temporal stand-by is set. At this time, since the remaining capacity is less, only the A.C. electric power which is formed from both of the commercial utility electric power and the solar cell module 21 is supplied to the load (PV electric power+commercial utility electric power).

Processing in Step S79: after completion of the temporal stand-by in the processing in Step S78, it is determined in processing in Step S79 whether or not the load electric power is smaller than the threshold value electric power L1 previously set. When it is determined in the processing in Step S79 that the load electric power is smaller than the threshold value electric power L1, the operation turns back to the processing in Step S74 (PV electric power generation+peak shift mode). On the other hand, when it is determined in the processing in Step S79 that the load electric power is equal to or larger than the threshold value electric power L1, the operation turns back to the processing in Step S77 (the determination as to presence or absence of the reception of the peak shift release command).

Processing in Step S80: when it is determined in the processing in Step S72 that the remaining capacity is smaller than the threshold value Cap1, since it is necessary to charge the battery module 6 with the electricity, the operation mode proceeds to (PV electric power generation+charging priority mode). (The PV electric power generation+the charging priority mode) is continuously carried out until it is determined in the processing in Step S72 that the remaining capacity is equal to or larger than the threshold value Cap1.

Processing in Step S81: when it is determined in the processing in Step S73 that the peak shift command has not been received, it is determined whether or not the remaining capacity is equal to or larger than the threshold value Cap3 or the discharging command has been received. When it is determined in the processing in Step S81 that the remaining capacity is smaller than the threshold value Cap3 or the discharging command has not been received, the operation proceeds to processing in Step S80 (PV electric power generation+charging priority mode).

Processing in Step S82: when it is determined in the processing in Step S81 that the remaining capacity is equal to or larger than the threshold value Cap3 or the forced discharging command has been received, the operation mode is switched over to the reverse electric power flow priority mode.

Processing in Step S83: it is determined whether or not the remaining capacity is equal to or larger than the threshold value Cap2'. When it is determined that the remaining capacity is equal to or larger than the threshold value Cap2', the reverse electric power flow priority mode is continuously carried out. On the other hand, when it is determined that the remaining capacity is smaller than the threshold value Cap2', the operation proceeds to the processing in (the PV electric power generation+the charging priority mode) in Step S80.

Concrete examples of the control carried out based on the mode transition flow in the case of presence of the PV electric power generation described above will now be described with reference to FIGS. 17 to 21.

[Example of PV Electric Power Generation+Charging Priority Mode]

An example of (the PV electric power generation+the charging priority mode) (the processing in Step S80 in FIG. 16) will now be described with reference to FIG. 17. In (the PV electric power generation+the charging priority mode), the commercial utility electric power is supplied to the load, and the battery module 6 is charged with the electricity from the D.C. electric power which is formed from the commercial utility electric power. In this case, preferably, the battery module 6 is charged with the electricity from the relatively inexpensive electric power such as the nighttime electric power.

Figure 17:
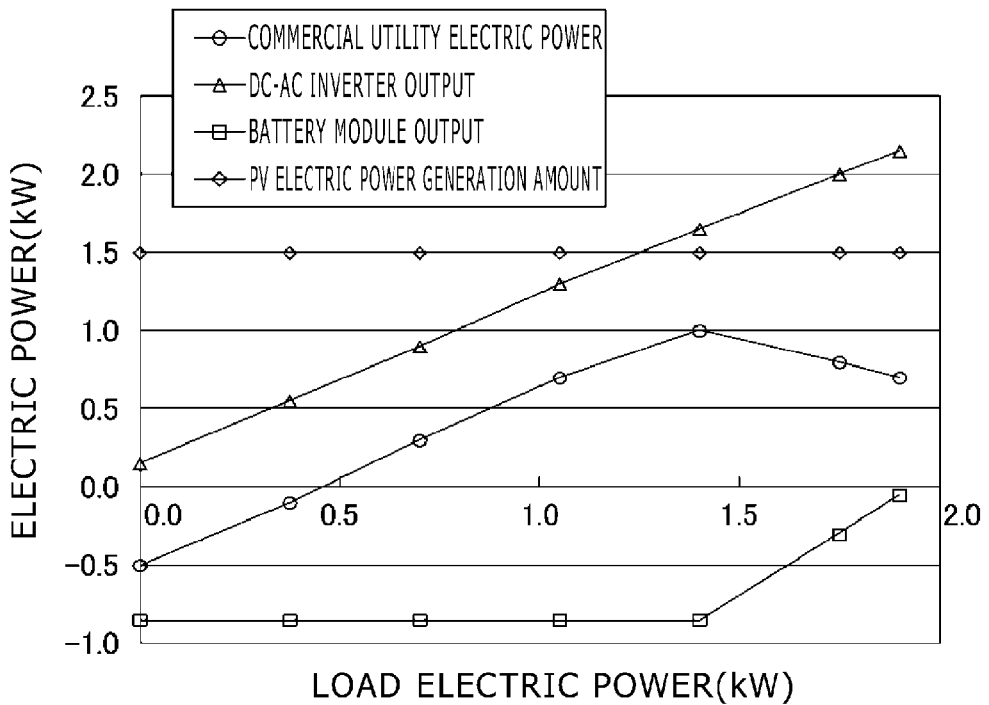
FIG. 17 is a flow chart explaining processing for (the PV electric power generation+a charging priority mode) in the electric power supplying apparatus according to the third embodiment of the present disclosure.

In FIG. 17, an axis of abscissa represents the change in the load electric power (kW), and an axis of ordinate represents the change in the electric power (kW). That is to say, a straight line connecting circle dots represents the change in the commercial utility electric power AC1 when the load electric power is changed. A straight line connecting triangle dots represents the change in the output electric power from the DC-AC inverter 4. Also, a straight line connecting square dots represents the change in the output electric power from the battery module 6. As an example, the PV electric power generation amount of 1.5 kW is made constant (a straight line connecting rhombus dots).

The output electric power from the DC-AC inverter becomes a value which is obtained by multiplying the input electric power by an efficiency (smaller than 1.0) of the DC-AC inverter 4. The output electric power from the DC-AC inverter 4 is obtained by summing up the commercial utility electric power, and the output electric power from the battery module 6. It is noted that the fact that the electric power is shifted to a negative side in the change in the output electric power from the battery module 6 represents that the battery module 6 is charged with the electricity. Also, the fact that in the change in the output electric power from the commercial electric power, the electric power is shifted to the negative side represents the reverse electric power flow. This also applies to descriptions given with reference to FIGS. 18 to 21 which will be described later. It is noted that the EMU 10 of the controller 8 holds therein a control table which is expressed in the form of graphs of FIGS. 17 to 21, and carries out the control for the mode switching or the like with reference to the control table in accordance with the load.

The example shown in FIG. 17 is an example in which the running is carried out with the commercial utility electric power of 2.5 kVA, and the remaining capacity (SOC) is 30%. Here, the running which is carried out with the commercial utility electric power of 2.5 kVA means the running in which the voltage of 100 V is made constant, and the current from the commercial utility power source is selected up to 25 A. Until the current from the commercial utility power source becomes up to 25 A, the commercial utility electric power is increased in correspondence to the load electric power, and the battery module 6 is charged with the electricity from a given electric power. When the load side output becomes equal to a predetermined electric power (for example, the input current becomes up to 25 A), an amount of charging for the battery module 6 is gradually decreased, and the increase in the commercial utility electric power is not carried out. Although in the example, the control is carried out with the maximum commercial utility electric power, at which of the stages the control is carried out can be suitably set.

(The PV electric power generation+the charging priority mode) is an operation mode in which the battery module 6 is preferentially charged with the electricity from the electric power from the PV electric power generation. When the PV electric power generation amount exceeds the maximum charging electric power with the light load, the surplus electric power is subjected to the reverse electric power flow. The charging for the battery module 6 is carried out with the given electric power. When the load side output exceeds the predetermined electric power value, the control is carried out in such a way that the value of the charging electric power for the battery module 6 is reduced so as not to be accompanied with the increase in the commercial utility electric power.

In the example shown in FIG. 17, the PV electric power generation amount is set constant (for example, 1.5 kW). For example, in the case of the PV electric power generation amount of 1.0 kW, a point at which the charging electric power for the battery module 6 is reduced is shifted to the left-hand side. Contrary to this, in the case of the PV electric power generation amount of 2.0 kW, the point at which the charging electric power for the battery module 6 is reduced is shifted to the right-hand side. The PV electric power generation amount is actually changed so as to correspond to sunshine hours. Since the speed of the change in the PV electric power generation amount is on the order of minutes, the electric power output/mixture ratio of the electric power is changed so as to correspond to the change in the PV electric power generation amount. In any of other operation modes as well, similarly, the control corresponding to the PV electric power generation amount is carried out.

[Example of Reverse Electric Power Flow Priority Mode]

Figure 18:
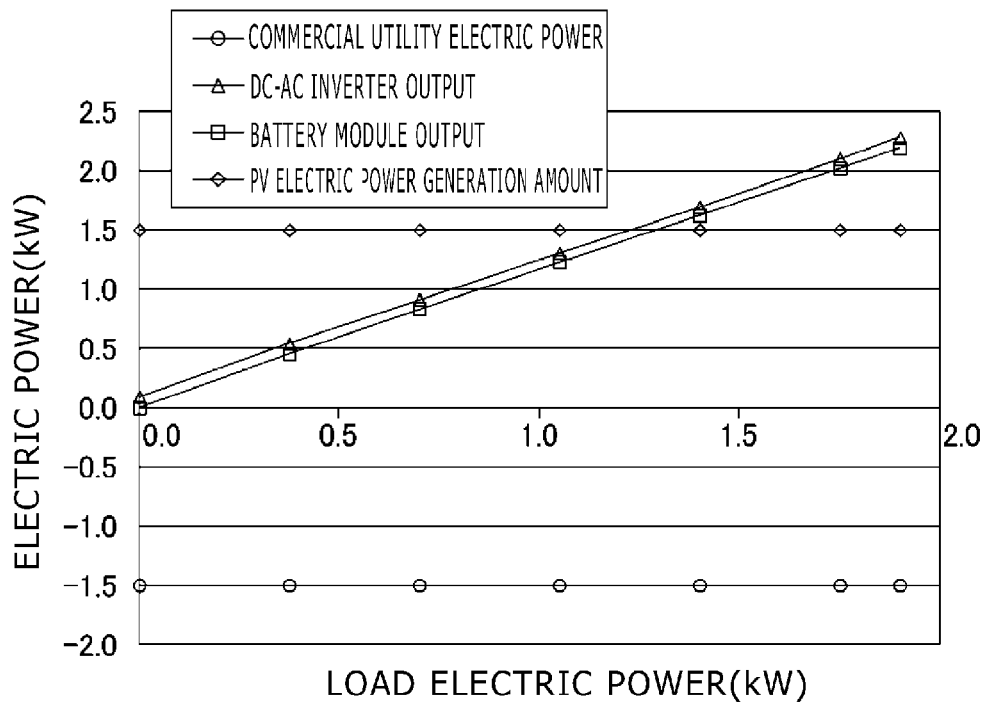
FIG. 18 is a flow chart explaining processing for a reverse electric power flow priority mode according to the third embodiment of the present disclosure.

An example of the reverse electric power flow priority mode (the processing in Step S82 in FIG. 16) will now be described with reference to FIG. 18. The example shown in FIG. 18 is an example in which the running is carried out with the commercial utility electric power of 2.5 kVA, and the remaining capacity (SOC) is 80%. The reverse electric power flow priority mode is an operation mode in which the electric power by the PV electric power generation is subjected to the reverse electric power flow as much as possible. The output electric power from the battery module 6 is supplied as the output electric power from the DC-AC inverter 4 to the load. In the range of the light load to the middle load, almost all the electric power generated by the solar cell module 21 is subjected to the reverse electric power flow. An amount of electric power for the reverse electric power flow is reduced along with the increase in the load side output electric power. However, when the load exceeds a predetermined value, preferably, the amount of electric power for the reverse electric power flow is reduced.

[Example of PV Electric Power Generation+Peak Shift Mode]

Figure 19:
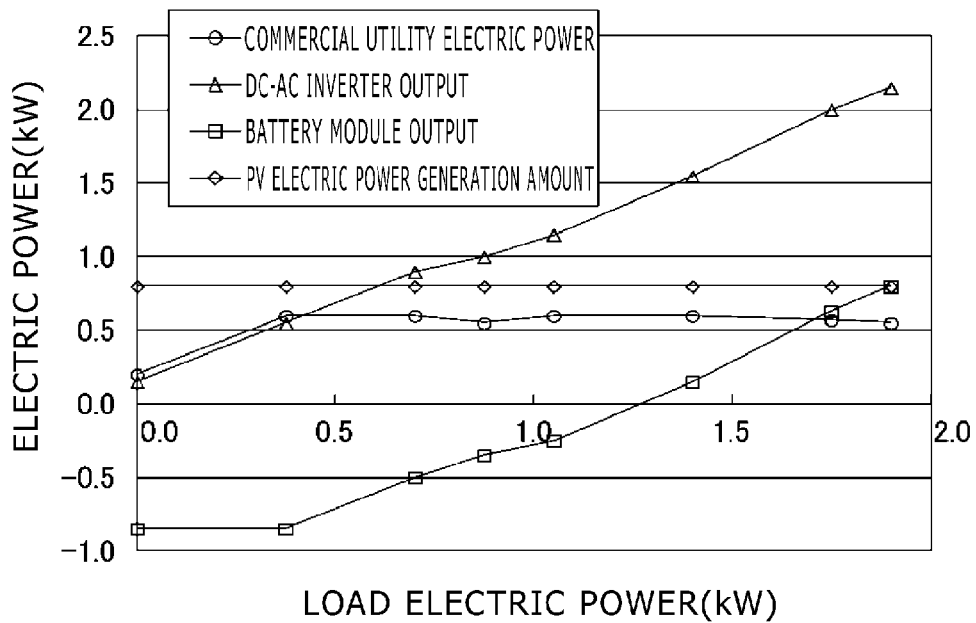
FIG. 19 is a flow chart explaining processing for (the PV electric power generation+a peak shift mode) according to the third embodiment of the present disclosure.

An example of (the PV electric power generation+the peak shift mode) (the processing in Step S74 in FIG. 16) will now be described with reference to FIG. 19. The example shown in FIG. 19 is an example in which the running is carried out with the commercial utility electric power of 2.5 kVA, and the remaining capacity (SOC) is 50%, and the PV electric power generation amount is 0.8 kW. The output electric power from the DC-AC inverter 4 is obtained by adding the commercial utility electric power and the output electric power from the battery module 6 to each other. Since the PV electric power generation amount is added to the peak shift operation in the case of absence of the PV electric power generation similar to the case of the first embodiment, it is possible to further suppress a consumed amount of commercial utility electric power. In the case of the time zone in which the load is low, the charging operation is carried out.

[Example of PV Electric Power Generation+Absence of Commercial Utility Electric Power Mode]

Figure 20:
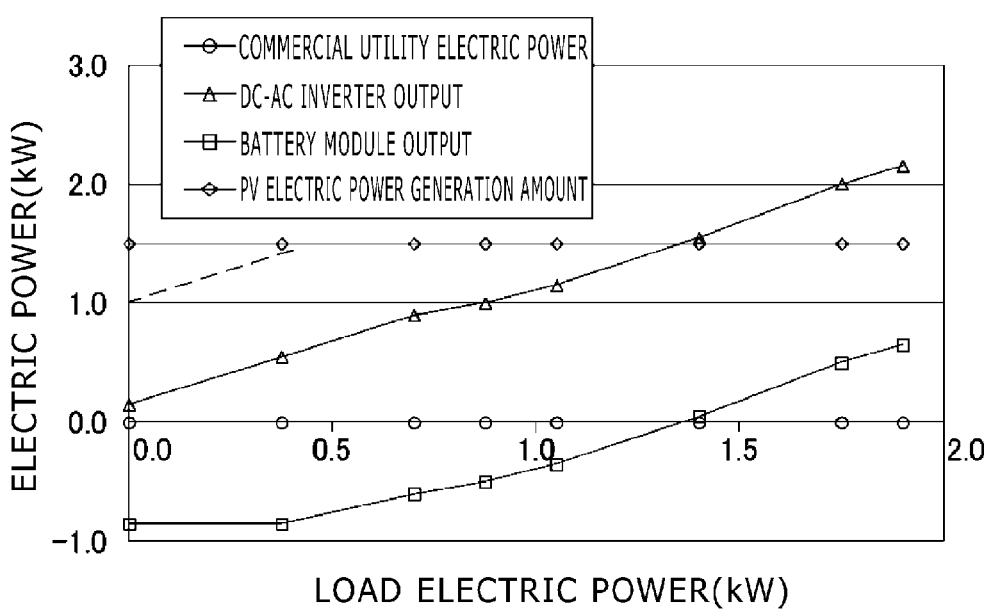
FIG. 20 is a flow chart explaining processing for (the PV electric power generation+a mode in the case of absence of a commercial utility electric power) according to the third embodiment of the present disclosure.

An example of (the PV Electric power generation+absence of the commercial utility electric power mode) (the processing in Step S45 in FIG. 14) will now be described with reference to FIG. 20. The example shown in FIG. 20 is an example in which the running is carried out with the commercial utility electric power of 2.5 kVA, and the remaining capacity (SOC) is 50%, and the PV electric power generation amount is 1.5 kW. The output electric power from the DC-AC inverter 4 is obtained by adding the PV electric power generation amount and the output electric power from the battery module 6 to each other.

In the case where the commercial utility electric power is absent, it may be impossible to carry out the reverse electric power flow. Thus, when the sum of the charging electric power for the battery module 6, and the output electric power from the inverter falls below the PV generated electric power, the surplus electric power by the PV electric power generation is not surplused. When the output electric power from the inverter exceeds the PV generated electric power, the shortfall is restocked with the discharging of the battery module 6.

Since in the example shown in FIG. 20, when the load is 0 kW, the PV electric power generation amount is 1.5 kW and the charging electric power of the battery module 6 is 0.9 kW, the electric power of 0.6 kW seems to become surplus. However, the PV electric power generation amount of 1.5 kW described here shows the maximum output electric power, and the actual output electric power is 0.9 kW. That is to say, the actual output electric power is indicated by a dotted line, and the state is provided in which the electric power of 0.6 kW is not fetched out as the load.

[Example of PV Electric Power Generation+Discharging Priority Mode]

Figure 21:
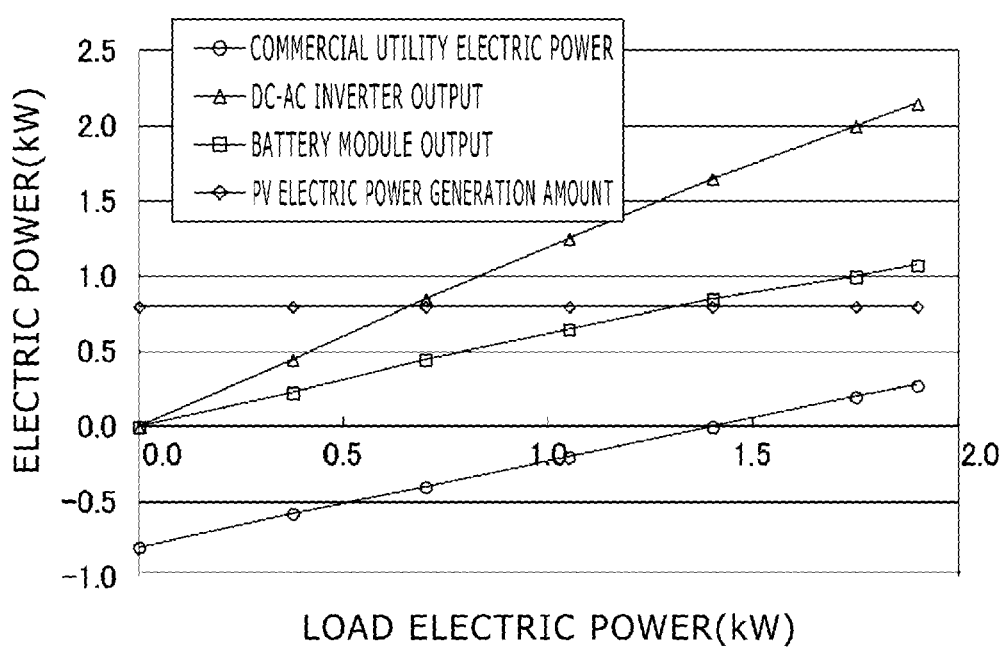
FIG. 21 is a flow chart explaining processing for (the PV electric power generation+a discharging priority mode) according to the third embodiment of the present disclosure.

An example of (the PV electric power generation+the discharging priority mode) will now be described with reference to FIG. 21. The example shown in FIG. 21 is an example in which the running is carried out with the commercial utility electric power of 2.5 kVA, the remaining capacity (SOC) is 80%, and the PV electric power generation amount is 0.8 kW. The output electric power from the DC-AC inverter 4 is obtained by adding the commercial utility electric power and the output electric power from the battery module 6 to each other.

[Modified Change of Third Embodiment]

Figure 22:
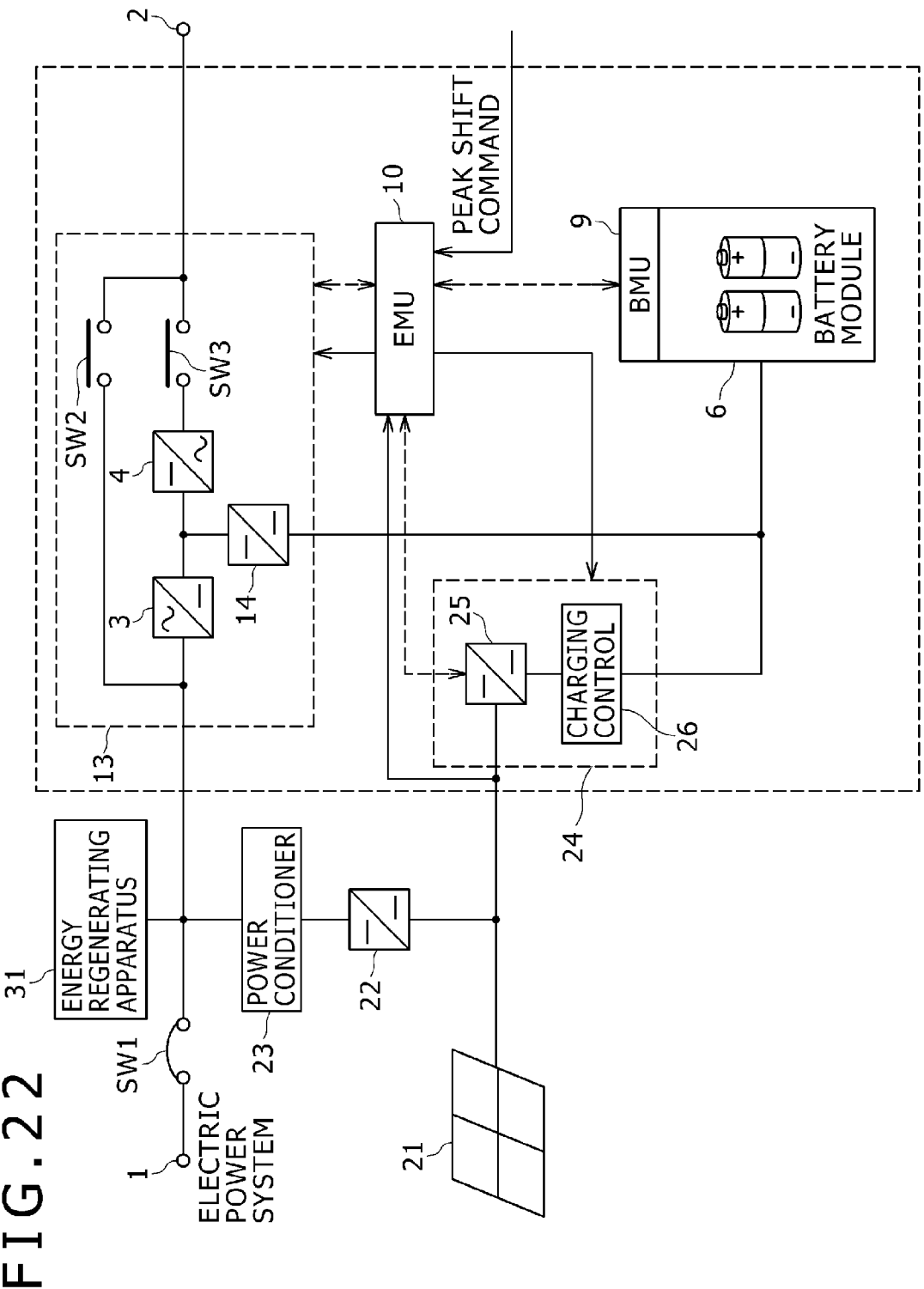
FIG. 22 is a block diagram showing a modified change of the third embodiment of the present disclosure.

A modified change of the third embodiment of the present disclosure having the solar cell module will now be described with reference to FIG. 22. Constituent elements corresponding to those in the third embodiment (refer to FIG. 13) are designated by the same reference symbols, respectively, and a description thereof is omitted here. In the modified change of the third embodiment, an energy regenerating apparatus 31 is provided, and an electric power from the energy regenerating apparatus 31 is added to both of the commercial utility electric power, and the generated electric power of the solar cell module 21. The energy is recovered to be effectively utilized.

Plural kinds of apparatuses can be used as the energy regenerating apparatus 31. For example, an electric power in a phase of a no-load running (ascending/descending operation) of an at-home elevator is regenerated in a battery to charge the battery with the electricity from the electric power through a bidirectional inverter. In a phase of load activation of the elevator, the electric power is supplied from the battery to a windlass through the bidirectional inverter. As a result, it is possible to reduce the load of the A.C. electric power.

As another example, there is electric power regeneration of an at-home air conditioner. After the exhaust heat is made to turn into the electric power by a heat pump, the regeneration is carried out for the battery through the bidirectional inverter to charge the battery with the electricity from the regenerated electric power. In a phase of an operation, the electric power is supplied from the battery to the air conditioner through the bidirectional inverter. As a result, it is possible to reduce the load of the A.C. electric power. In addition, after high-frequency radiation in a microwave oven is received by a coil to be made to turn into an electric power, the resulting electric power is regenerated in the battery through the bidirectional inverter to charge the battery with the electricity from the regenerated electric power. In the phase of the operation, the electric power is supplied from the battery through the bidirectional inverter. As a result, it is possible to reduce the loss of the A.C. electric power.

As still another example, a synchronous type electric generator is provided in a rotary shaft of an exercise bike (for diet or for training) used in a home. The synchronous type electric generator generates the electric power while the exercise bike is used. The electric power is supplied to an electronic apparatus in the home through the bidirectional inverter. As a result, a daily training amount is converted into the electric power, which is an encouragement to the training.

<4. Application Example>

[Electric Power Selling as Application Example]

In the present Japanese system, when the electric power (PV electric power) generated by the solar cell module is temporarily stored in the battery, it may be impossible to subject that electric power to the electric power selling (reverse electric power flow). For the purpose of solving this problem, the PV electric power and the commercial utility electric power are distinguished from each other, and thus the PV electric power is enabled to be sold even when it is temporarily stored in the battery.

Figure 23:
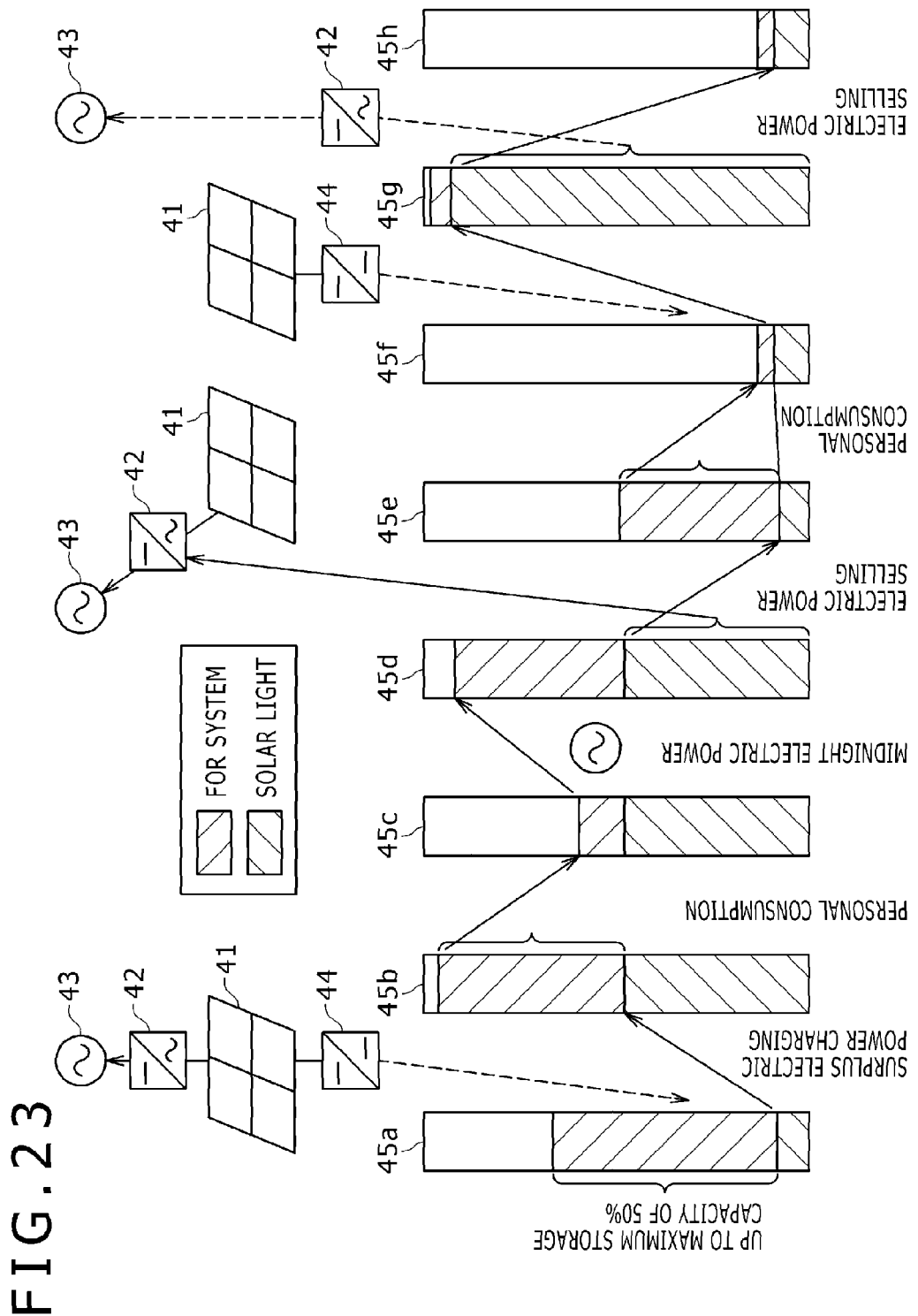
FIG. 23 is a schematic diagram explaining a first example of application to which the electric power supplying apparatus according to the first embodiment of the present disclosure is applied.

FIG. 23 shows an example of control for electric power selling. Time elapses from the left-hand side to the right-hand side in FIG. 23. A PV electric power generated by a solar cell module 41 is converted into a commercial utility electric power 43 through the reverse electric power flow and via a DC-AC inverter 42. On the other hand, a battery module is charged with the electricity from the PV electric power through a DC-DC converter 44. As a result of the charging of the battery module with the electricity from the PV electric power, a charging state of the battery module is changed from a charging state 45a over to a charging state 45b. Here, as an example, an amount of charging for the battery module with the electricity from the commercial utility electric power is limited to a maximum storage capacity of 50%. However, such a limit is not set for the charging through the PV electric power.

Owing to a personal consumption of electricity, the charging state transits from the charging state 45b to a charging state 45c. The battery module is charged with the electricity from the midnight electric power, and as a result, the charging state transits from the charging state 45c to a charging state 45d. In this stage, the electric power for the charging by the PV electric power is sold. As a result, the charging state transits from the charging state 45d to a charging state 45e. The object of the trading electricity in the daytime is the PV electric power in the previous day, and thus is the electric power for the surplus electric power charging.

As a result of a personal consumption, the charging state 45e transits to a charging state 45f. The charging with the electricity from the PV electric power is carried out, and as a result, the charging state 45f transits to a charging state 45g. In this state, the electric power, for the charging with the electricity from the PV electric power is sold. As a result, the charging state 45g transits to a charging state 45h. In such a manner, even in the case of the PV electric power which is temporarily stored in the battery module, an electric power for the PV electric power can be sold.

Figure 24:
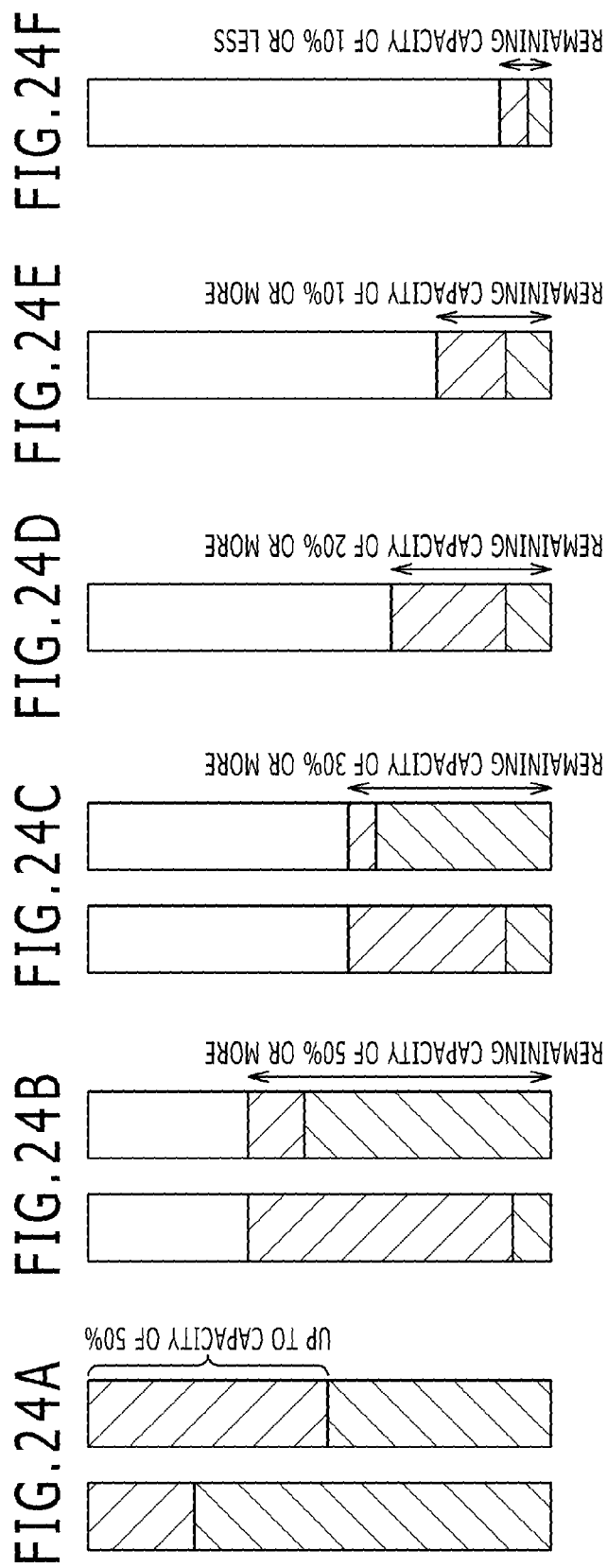
FIGS. 24A to 24F are respectively schematic diagrams explaining the first example of application to which the electric power supplying apparatus according to the first embodiment of the present disclosure is applied.

As shown in FIGS. 24A to 24F, the output electric power from the battery module in the phase of the discharging is limited. In a state in which the battery module is fully charged with the electricity as shown in FIG. 24A, or in the case where as shown in FIG. 24B, the remaining capacity of 50% or more is present, the discharging of 0.5 C or more becomes possible. It is noted that 1 C means a current value with which the electric charges accumulated in the battery cell having a nominal capacity are discharged at a constant current and the discharging ends for just one hour.

When as shown in FIG. 24C, the remaining capacity of 30% or more is present, 0.4 C discharging becomes possible. When as shown in FIG. 24D, the remaining capacity of 20% or more is present, 0.3 C discharging becomes possible. When as shown in FIG. 24E, the remaining capacity of 10% or more is present, 0.2 C discharging becomes possible. Also, when as shown in FIG. 24F, the remaining capacity is equal to or smaller than 10%, the discharging is stopped.

[Storage System in House as Application Example]

Figure 25:
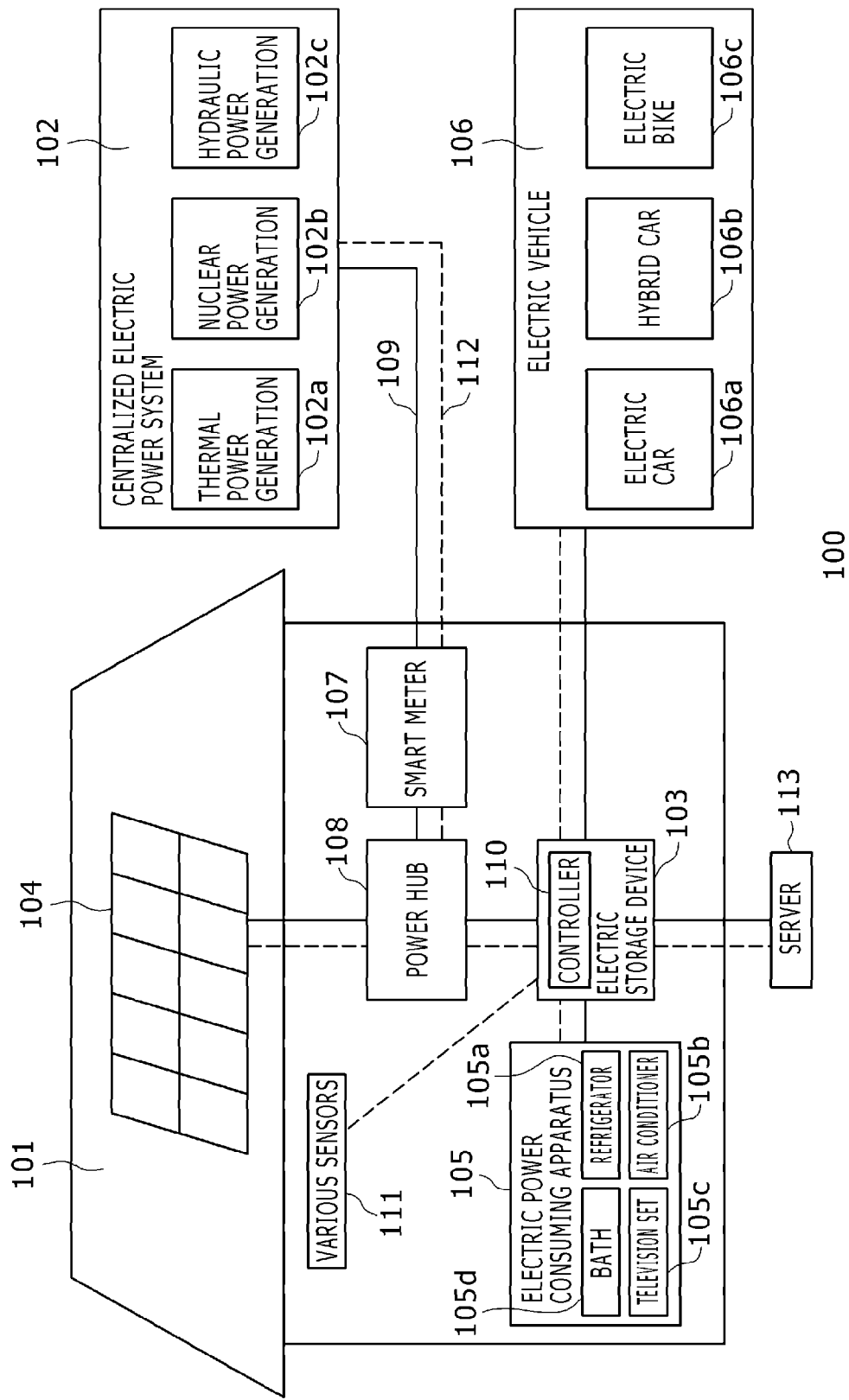
FIG. 25 is a schematic diagram explaining a second example of application to which the electric power supplying apparatus according to the first embodiment of the present disclosure is applied.

An example in which the present disclosure is applied to a storage system for a house will now be described with reference to FIG. 25. For example, in an electric storage system 100 for a house 101, an electric power is supplied from a centralized electric power system 102 including thermal power generation 102a, nuclear power generation 102b, hydraulic power generation 102c, and the like to an electric storage device 103 through an electric power grid 109, an information network 112, a smart meter 107, a power hub 108, and the like. Along with this, an electric power is supplied from an independent power source such as an in-home electric power generating apparatus 104 to the electric storage device 103. The electric powers supplied to the electric storage device 103 are stored. The electric power which is to be used in the house 101 is fed by using the electric storage device 103. The similar electric storage system can also be used not only in the housing 101, but also in a building.

The house 101 is provided with the electric power generating apparatus 104, an electric power consuming apparatus 105, the electric storage device 103, a controller 110 for controlling the individual apparatuses, the smart meter 107, and a sensor 111 for acquiring various kinds of pieces of information. The individual apparatuses are connected to one another through both of the electric power grid 109, and the information network 112. A solar cell, a fuel cell or the like is utilized as the electric power generating apparatus 104, and the electric power generated is supplied to the electric power consuming apparatus 105 and/or the electric storage device 103. The electric power consuming apparatus 105 includes a refrigerator 105a, an air conditioner 105b, a television set 105c, a bath 105d, and the like. In addition, the electric power consuming apparatus 105 includes an electric vehicle 106. The electric vehicle 106 includes an electric car 106a, a hybrid car 106b, and an electric bike 106c.

The electric storage device 103 is composed of a secondary battery or a capacitor. For example, the electric storage device 103 is composed of a lithium-ion battery. The lithium-ion battery may be stationary type one or one which is used in the electric vehicle 106. The smart meter 107 has a function of measuring a used amount of commercial utility electric power, and transmitting information on the used amount of commercial utility electric power thus measured to an electric power company. For the electric power grid 109, any one or plural ones of D.C. electric power feeding, A.C. electric power feeding, and non-contact type electric power feeding may be combined with one another. The present disclosure can be applied to the electric power supplying apparatus composed of the electric storage device 103 and the controller 110.

The various kinds of sensors 111, for example, are a human body sensing sensor, an illuminance sensor, an object detecting sensor, a consumed power sensor, a vibration sensor, a contact sensor, a temperature sensor, an infrared ray sensor, and the like. Information acquired from the various kinds of sensors 111 is transmitted to the controller 110. A state of the weather, a state of the human being, and the like are grasped based on the information supplied from the various kinds of sensors 111 to automatically control the electric power consuming apparatus 105, thereby making it possible to minimize the energy consumption. In addition, the controller 110 can transmit information on the house 101 to the external electric power company or the like through the Internet.

The power hub 108 carries out branching of the electric power line, and the processing such as the DC-AC conversion. A communication system for the information network 112 connected to the controller 110 includes a method using a communication interface such as a Universal Asynchronous Receiver-Transceiver (UART), and a method utilizing a sensor network complying with the wireless communication standard such as Bluetooth (registered trademark), ZigBee or Wi-Fi. The Bluetooth system is applied to a multi-media communication and can make a communication based on one-to-many connection. ZigBee uses a physical layer of Institute of Electrical and Electronics Engineers (IEEE) 802.15.4. IEEE 802.15.4 is a name of the short distance wireless network standard called either a Personal Area Network (PAN) or a Wireless (W) PAN.

The controller 110 is connected to an external server 113. The external server 113 may be managed by any one of the house 101, the electric power company, and a serviced provider. Information which is transmitted/received by the server 113, for example, is consumed electric power information, life pattern information, an electric power charge, weather information, natural disaster information, and information on electric power trade. Although these pieces of information may be transmitted/received by the electric power consuming apparatus 105 (such as the television set) provided inside the home, these pieces of information may also be transmitted/received by an apparatus (such as a mobile phone) provided outside the home. Also, these pieces of information may also be displayed on an apparatus having a display function, for example, the television set, the mobile phone, a Personal Digital Assistants (PDA) or the like.

The controller 110 for controlling the individual portions is composed of a Central Processing Unit (CPU), a Random Access Memory (RAM), a Read Only Memory (ROM), and the like. In this case, the controller 110 is accommodated in the electric storage device 103. The controller 110 is connected to the electric storage device 103, the in-home electric power generating apparatus 104, the electric power consuming apparatus 105, the various kinds of sensors 111, and the server 113 through the information network 112. Also, the controller 110 has a function of, for example, adjusting a used amount of the commercial utility electric power, and an amount of generated electric power. Note that, the controller 110 may have a function of carrying out the electric power trade in the electric power market, and the like in addition to this function.

As described above, not only the centralized electric power system 102 such as the thermal power generation 102a, the nuclear power generation 102b, and the hydraulic power generation 102c as the electric power, but also the generated electric power of the in-home electric power generating apparatus 104 (solar electric power generation, and the wind force electric power generation) can be stored in the electric storage device 103. Therefore, the controller 110 can carry out the control such that even when the generated electric power of the in-home electric power generating apparatus 104 is changed, an amount of electric power fed to the outside is made constant, or the electric power is discharged as much as needed. For example, it is possible to use the electric power in such a way that the electric power obtained from the solar electric power generation is stored in the electric storage device 103, the midnight electric power whose charge is inexpensive is stored in the electric storage device 103 in the nighttime, and the electric power electrically stored in the electric storage device 103 is discharged in the daytime time zone in which the charge is expensive to be utilized.

It is noted that although in this case, the description has been given with respect to the example in which the controller 110 is accommodated in the electric storage device 103, the controller 110 may be accommodated in the smart meter 107 or may be configured independently. In addition, the electric storage system 100 may be used for plural homes in an apartment unit, or may be used for plural family houses.

[Electric Storage System in Vehicle as Application Example]

An example in which the present disclosure is applied to an electric storage system for a vehicle will now be described with reference to FIG. 26. FIG. 26 schematically shows an example of a configuration of a hybrid vehicle adopting a series hybrid system to which the present disclosure is applied. The hybrid vehicle adopting a series hybrid system is a car which travels with an electric power driving force converting device by using an electric power generated in an electric power generator which is driven by an engine or an electric power obtained from the electric power temporarily stored in a battery.

An engine 201, an electric power generator 202, an electric power driving force converting device 203, a drive wheel 204a, a drive wheel 204b, a wheel 205a, a wheel 205b, a battery 208, a vehicle controller 209, various kinds of sensors 210, a charging inlet 211 are mounted to the hybrid vehicle 200. The battery 208 is used as the battery module in each of the electric power supplying apparatuses of the embodiments of the present disclosure described above. That is to say, the battery 208 of the electric vehicle is used as the electric power supplying apparatus for the home or the like.

The hybrid vehicle 200 travels with the electric power driving force converting device 203 as a source of power. An example of the electric power driving force converting device 203 is a motor. The electric power driving force converting device 203 is actuated by the electric power of the battery 208, and a rotative force of the electric power driving force converting device 203 is transferred to the drive wheels 204a and 204b. It is noted that DC-AC conversion or reverse conversion (AC-DC conversion) is used in a necessary portion, whereby an A.C. motor or a D.C. motor can also be applied to the electric power driving force converting device 203. The various kinds of sensors 210 control an engine rotation number through the vehicle controller 209, and control an aperture (throttle aperture) of a throttle valve (not shown). The various kinds of sensors 210 include a speed sensor, an acceleration sensor, an engine rotation number sensor, and the like.

The rotative force of the engine 201 is transferred to the electric power generator 202, and thus the electric power which is generated by the electric power generator 202 by using the rotative force can be stored in the battery 208.

When the hybrid vehicle 200 is decelerated by a braking mechanism (not shown), a resistive force in a phase of the deceleration is applied as a rotative force to the electric power driving force converting device 203. Also, a regenerative electric power which is generated by the electric power driving force converting device 203 by using the rotative force is stored in the battery 208.

The battery 208 is connected to a power source which is provided outside the hybrid vehicle 200 to receive the supply of the electric power from the external power source with the charging inlet 211 as an input inlet, thereby making it possible to store therein the electric power thus received.

Although not illustrated, the hybrid vehicle 200 may include an information processor for executing processing for information on the vehicle control based on information on a secondary battery. Such an information processor, for example, includes an information processor for carrying out battery remaining capacity display based on information on the remaining capacity of the battery, and the like.

It is noted that in the above, the description has been given by exemplifying the series hybrid car which travels with the motor by using either the electric power generated by the electric power generator driven by the engine or the electric power obtained from that electric power temporarily stored in the battery. However, the present disclosure can also be effectively suitably applied to a parallel-hybrid car which switches and uses suitably three systems: the parallel-hybrid car travels with only an engine; the parallel-hybrid car travels with only a motor; and the parallel-hybrid car travels with both of the engine and the motor by using an output from the engine and an output from the motor as a driving source. In addition, the present disclosure can also be effectively suitably applied to a so-called electric vehicle which travels with the drive by only a driving motor without using an engine.

It is noted that the present disclosure can also adopt the following constitutions.

(1) An electric power supplying apparatus including:
an electric storage device; and
a control portion configured to control processing for mixing an output from the electric storage device, and an electric power of an external electric power system with each other in accordance with at least one of a peak shift command, a load electric power, and a remaining capacity of the electric storage device,
wherein an alternating current electric power is formed in the mixing processing.

(2) The electric power supplying apparatus described in the paragraph (1), wherein a first threshold value is set for the remaining capacity of the electric storage device, and when the remaining capacity is smaller than the first threshold value, the alternating current electric power is formed by the external electric power system and the electric storage device is charged by the external electric power system.

(3) The electric power supplying apparatus described in the paragraph (1), wherein a second threshold value is set for the remaining capacity of the electric storage device, and when the remaining capacity is larger than the second threshold value, the alternating current electric power is formed by a mixture output of the electric power of the external electric power system, and the output electric power from the electric storage device.

(4) The electric power supplying apparatus described in the paragraph (1), wherein a threshold value is set for a load electric power, and when the load electric power is smaller than the threshold value, the alternating current electric power is formed by the external electric power system and the electric storage device is charged by the external electric power system, while when the load electric power is larger than the threshold value, the alternating current electric power is formed by a mixture output of the electric power of the external electric power system, and the output electric power from the electric storage device.

(5) The electric power supplying apparatus described in the paragraph (4), wherein the threshold value for the load electric power is set in accordance with a contracted electric power.

(6) The electric power supplying apparatus described in any one of the paragraphs (1) to (5),
wherein a processing portion executing the mixture processing includes a converter converting the electric power of the external electric power system into a direct current electric power and an inverter converting a direct current electric power into an alternating current electric power, the inverter being connected in series with the converter;
the electric storage device is connected between the converter and the inverter; and
an output from the converter, and the output from the electric storage device are mixed based on a direct current electric power.

(7) The electric power supplying apparatus described in the paragraph (6), wherein the electric storage device is connected between the converter and the inverter through a charging circuit and a boosting circuit connected in parallel with each other.

(8) The electric power supplying apparatus described in the paragraph (1), further including
an inverter configured to convert the output from the electric storage device into an alternating current electric power,
wherein an alternating current electric power is formed by the inverter so as to agree in frequency and phase with the electric power of the external electric power system, and is mixed with the electric power of the external electric power system to be outputted.

(9) An electric power supplying method including:
executing processing for mixing an output from an electric storage device, and an electric power of an external electric power system with each other, thereby outputting an alternating current electric power; and
controlling a mixture ratio in the mixing processing in accordance with at least one of a peak shift command, a load electric power, and a remaining capacity of the electric storage device.

(10) The electric power supplying method described in the paragraph (9), wherein the mixture ratio is controlled in accordance with the peak shift command.

(11) An inverter, wherein a direct current electric power formed from an electric power of an external electric power system, and a direct current electric power from an electric storage device are mixed with each other, and a resulting electric power is supplied to the inverter, thereby forming an alternating current electric power.

(12) An electric vehicle including:
a converter configured to receive an electric power from an electric storage device, and convert the electric power into a driving force for the electric vehicle; and
a controller configured to execute information processing about vehicle control based on information on the electric storage device,
wherein the electric vehicle executes mixing processing for mixing an output from the electric storage device, and an electric power of an external electric power system with each other, thereby outputting an alternating current electric power, and controls a mixture ratio in the mixing processing in accordance with a load electric power, and a remaining capacity of the electric storage device.

(13) An electric power supplying apparatus including:
a connecting portion configured to connect an external electric power system and an electric power generating apparatus to each other;
an electric storage device; and
a control portion configured to control processing for mixing an output from the electric power generating apparatus, an output from the electric storage device, and an electric power of the external electric power system with one another in accordance with at least one of a peak shift command, a load electric power, and a remaining capacity of the electric storage device,
wherein an alternating current electric power is formed in the mixing processing.

(14) The electric power supplying apparatus described in the paragraph (13), wherein a processing portion configured to execute the mixture processing includes a converter converting the electric power of the external electric power system into a direct current electric power, and an inverter configured to convert a direct current electric power into an alternating current electric power, the inverter being connected in series with the converter;

the electric power generating apparatus and the electric storage device are connected in parallel with each other between the converter and the inverter; and an output from the converter, an output from the electric power generating apparatus, and the output from the electric storage device are mixed with one another based on a direct current electric power.

(15) The electric power supplying apparatus described in any one of the paragraphs (13) and (14), wherein the electric storage device is charged by an electric power of the electric power generating apparatus; and when the electric power of the electric power generating apparatus is larger than a maximum charging electric power of the electric storage device, a surplus electric power is subjected to reverse electric power flow.

(16) The electric power supplying apparatus described in any one of the paragraphs (13) and (14), further including a charging portion configured to charge the electric storage device by an electric power of the electric power generating apparatus, wherein the control is carried out in such a way that when an electric power on a load side is equal to or larger than a predetermined value, the electric power used to charge the electric storage device is reduced.

(17) The electric power supplying apparatus described in any one of the paragraphs (13) and (14), further including a charging portion configured to charge the electric storage device by an electric power of the electric power generating apparatus, wherein almost all the electric power of the electric power generating apparatus is subjected to reverse electric power flow to the external electric power system by the charging portion.

(18) The electric power supplying apparatus described in any one of the paragraphs (13) and (14), wherein a threshold value is set for a load electric power, and when the load electric power is smaller than the threshold value, the alternating current electric power is formed by the electric power of the external electric power system and the electric power of the electric power generating apparatus, and the electric storage device is charged by the electric power of the external electric power system and the electric power of the electric power generating apparatus, while when the load electric power is larger than the threshold value, the alternating current electric power is formed by a mixture output of the electric power of the external electric power system, and the output electric power from the electric storage device.

(19) The electric power supplying apparatus described in any one of the paragraphs (13) and (14), wherein when the external electric power system is absent, a total electric power of the electric power of the electric power generating apparatus, and the electric power of the electric storage device is set as the alternating current electric power.

(20) An electric vehicle including:

a converter configured to receive an electric power from an electric storage device, and convert the electric power into a driving force for the electric vehicle; and a controller configured to execute information processing about vehicle control based on information on the electric storage device, wherein the electric vehicle executes processing for mixing an output from an electric power generating apparatus, an output from the electric storage device, and an electric power of an external electric power system with one another, thereby outputting an alternating current electric power, and controls a mixture ratio in the mixing processing in accordance with a load electric power, and a remaining capacity of the electric storage device.

<5. Modified Changes>

Although the present disclosure has been mainly concretely described based on the embodiments so far, the present disclosure is by no means limited thereto, and thus various kinds of modified changes based on the technical idea of the present disclosure can be made. For example, the electric power for the charging of the electric storage device may be formed by the electric power generating equipment (such as the solar cell or the wind force electric power generation) utilizing the renewable energy.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An electric power supplying apparatus, comprising:
an electric storage device; and
a control portion configured to control processing for mixing an output from said electric storage device, and an electric power of an external electric power system with each other in accordance with at least one of a peak shift command, a load electric power, and a remaining capacity of said electric storage device,
wherein an alternating current electric power is formed in the mixing processing, and
wherein said control portion is configured to switch an operation mode of said electric power supplying apparatus to at least one of a charging priority mode, a discharging priority mixture mode, a discharging priority mode, and a peak shift mode, based on reception of said peak shift command.

2. The electric power supplying apparatus according to claim 1, wherein in said charging priority mode, a first threshold value is set for the remaining capacity of said electric storage device, and in an event the remaining capacity is smaller than the first threshold value, the alternating current electric power is formed by said external electric power system and said electric storage device is charged by said external electric power system.

3. The electric power supplying apparatus according to claim 1, wherein in said discharging priority mixture mode, a second threshold value is set for the remaining capacity of said electric storage device, and in an event the remaining capacity is larger than the second threshold value, the alternating current electric power is formed by a mixture output of the electric power of said external electric power system and the output electric power from said electric storage device.

4. The electric power supplying apparatus according to claim 1, wherein in said peak shift mode, a threshold value is set for a load electric power, and in an event the load electric power is smaller than the threshold value, the alternating current electric power is formed by said external electric power system and said electric storage device is charged by said external electric power system, while in an event the load electric power is larger than the threshold value, the alternating current electric power is formed by a mixture output of the electric power of said external electric power system, and the output electric power from said electric storage device.

5. The electric power supplying apparatus according to claim 4, wherein the threshold value for the load electric power is set in accordance with a contracted electric power.

6. The electric power supplying apparatus according to claim 1, further comprising
a processing portion configured to execute the mixing processing, wherein the processing portion includes a converter converting the electric power of said external electric power system into a direct current electric power and an inverter converting a direct current electric power into an alternating current electric power, said inverter being connected in series with said converter;
said electric storage device is connected between said converter and said inverter; and
an output from said converter, and the output from said electric storage device are mixed based on a direct current electric power.

7. The electric power supplying apparatus according to claim 6, wherein said electric storage device is connected between said converter and said inverter through a charging circuit and a boosting circuit connected in parallel with each other.

8. The electric power supplying apparatus according to claim 1, further comprising an inverter configured to convert the output from said electric storage device into an alternating current electric power, wherein the alternating current electric power is formed by said inverter so as to agree in frequency and phase with the electric power of said external electric power system, and is mixed with the electric power of said external electric power system to be outputted.

9. An electric power supplying method, comprising:
executing processing for mixing an output from an electric storage device of an electric power supplying apparatus, and an electric power of an external electric power system with each other, thereby outputting an alternating current electric power; and
controlling a mixture ratio in the mixing processing in accordance with at least one of a peak shift command, a load electric power, and a remaining capacity of said electric storage device,
wherein said controlling corresponds to switching an operation mode of said electric power supplying apparatus, to at least one of a charging priority mode, a discharging priority mixture mode, a discharging priority mode, and a peak shift mode, based on reception of said peak shift command.

10. The electric power supplying method according to claim 9, wherein the mixture ratio is controlled in accordance with the peak shift command.

11. An inverter of an electric power supplying apparatus, wherein a direct current electric power formed from an electric power of an external electric power system, and a direct current electric power from an electric storage device are mixed with each other in accordance with an operation mode of said electric power supplying apparatus, and a resulting electric power is supplied to said inverter, thereby forming an alternating current electric power,
wherein said inverter is configured to switch the operation mode of said electric power supplying apparatus to at least one of a charging priority mode, a discharging priority mixture mode, a discharging priority mode, and a peak shift mode, based on reception of a peak shift command.

12. An electric vehicle, comprising:
a converter configured to receive an electric power from an electric storage device, and convert the electric power into a driving force for said electric vehicle; and
a controller configured to execute information processing about vehicle control based on information on said electric storage device,
wherein said electric vehicle is configured to execute mixing processing for mixing an output from said electric storage device, and an electric power of an external electric power system with each other, thereby outputting an alternating current electric power, and control a mixture ratio in the mixing processing in accordance with at least one of a load electric power, a peak shift command, and a remaining capacity of said electric storage device, and
wherein said electric vehicle is configured to switch to at least an operation mode among a charging priority mode, a discharging priority mixture mode, a discharging priority mode, and a peak shift mode, based on reception of said peak shift command.

13. The electric power supplying apparatus according to claim 1, wherein in said discharging priority mode, a second threshold value is set for the remaining capacity of said electric storage device, and in an event the remaining capacity is larger than the second threshold value, the alternating current electric power is formed by the output electric power from said electric storage device.

* * * * *